United States Patent
Takaoka et al.

(10) Patent No.: US 10,015,794 B2
(45) Date of Patent: *Jul. 3, 2018

(54) BASE STATION APPARATUS AND RESOURCE ALLOCATION METHOD

(71) Applicant: Sun Patent Trust, New York, NY (US)

(72) Inventors: Shinsuke Takaoka, Osaka (JP); Seigo Nakao, Singapore (SG); Daichi Imamura, Beijing (CN); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,247

(22) Filed: May 5, 2017

(65) Prior Publication Data

US 2017/0245279 A1 Aug. 24, 2017

Related U.S. Application Data

(63) Continuation of application No. 15/245,747, filed on Aug. 24, 2016, now Pat. No. 9,693,353, which is a
(Continued)

(30) Foreign Application Priority Data

Nov. 14, 2008 (JP) .................................. 2008-292653

(51) Int. Cl.
*H04W 72/04* (2009.01)
*H04L 5/00* (2006.01)
(Continued)

(52) U.S. Cl.
CPC ...... *H04W 72/0453* (2013.01); *H04B 7/0456* (2013.01); *H04L 1/0003* (2013.01);
(Continued)

(58) Field of Classification Search
CPC ............. H04L 27/0008; H04L 27/2636; H04L 5/0021; H04W 72/0453
See application file for complete search history.

(56) References Cited

U.S. PATENT DOCUMENTS 6,574,778 B2 * 6/2003 Chang ................. G06F 17/5022
716/102
6,629,293 B2 * 9/2003 Chang ................. G06F 17/5022
716/103
(Continued)

FOREIGN PATENT DOCUMENTS

CN 1992552 A 7/2007
JP 2001-148682 A 5/2001
(Continued)

OTHER PUBLICATIONS

Extended European Search Report, dated Jul. 30, 2013, for corresponding European Application No. 09825929.4-1505 / 2348661, 9 pages.
(Continued)

*Primary Examiner* — Syed S Ali
(74) *Attorney, Agent, or Firm* — Seed IP Law Group LLP

(57) ABSTRACT

A wireless communication terminal apparatus wherein even when a SC-FDMA signal is divided into a plurality of clusters and the plurality of clusters are then mapped to respective discontinuous frequency bands (when C-SC-FDMA is used), the improvement effect of system throughput can be maintained, while the user throughput can be improved. In the apparatus, a DFT unit (210) subjects a symbol sequence of time domain to a DFT process, thereby generating signals of frequency domain. A setting unit (211) divides the signals input from the DFT unit (210) into a plurality of clusters according to a cluster pattern that is in accordance with an MCS set, an encoding size, or the number of Ranks occurring during MIMO transmissions,
(Continued)

which is indicated in those signals input, and then maps the plurality of clusters to the respective ones of a plurality of discontinuous frequency resources, thereby setting a constellation of the plurality of clusters in the frequency domain.

10 Claims, 36 Drawing Sheets

Related U.S. Application Data continuation of application No. 14/861,860, filed on Sep. 22, 2015, now Pat. No. 9,462,588, which is a continuation of application No. 14/581,649, filed on Dec. 23, 2014, now Pat. No. 9,173,220, which is a continuation of application No. 14/144,249, filed on Dec. 30, 2013, now Pat. No. 8,971,296, which is a continuation of application No. 13/128,480, filed as application No. PCT/JP2009/006086 on Nov. 13, 2009, now Pat. No. 8,687,575.

(51) Int. Cl.
*H04L 27/00* (2006.01)
*H04L 27/26* (2006.01)
*H04L 1/00* (2006.01)
*H04B 7/0456* (2017.01)
*H04J 13/00* (2011.01)

(52) U.S. Cl.
CPC .......... *H04L 1/0009* (2013.01); *H04L 5/006* (2013.01); *H04L 5/0007* (2013.01); *H04L 5/0021* (2013.01); *H04L 5/0023* (2013.01); *H04L 5/0041* (2013.01); *H04L 5/0046* (2013.01); *H04L 27/0008* (2013.01); *H04L 27/2636* (2013.01); *H04J 13/0059* (2013.01)

(56) References Cited

U.S. PATENT DOCUMENTS

| | | | |
|---|---|---|---|
| 6,694,501 B2* | 2/2004 | Chang | G06F 17/5022 716/122 |
| 7,969,943 B2 | 6/2011 | Miki et al. | |
| 7,974,258 B2 | 7/2011 | Holt | |
| 8,311,135 B2 | 11/2012 | Suzuki | |
| 8,363,577 B2 | 1/2013 | Ji et al. | |
| 8,396,034 B2 | 3/2013 | Choi et al. | |
| 8,493,836 B2 | 7/2013 | Lee et al. | |
| 8,520,494 B2* | 8/2013 | Yang | H04L 5/0023 370/204 |
| 8,520,610 B2 | 8/2013 | Lee et al. | |
| 8,522,105 B2 | 8/2013 | Papasakellariou et al. | |
| 8,526,384 B2 | 9/2013 | Jian et al. | |
| 2005/0156780 A1 | 7/2005 | Bonthron et al. | |
| 2006/0250935 A1* | 11/2006 | Hamamoto | H04L 5/0032 370/203 |
| 2007/0291640 A1 | 12/2007 | Zhang et al. | |
| 2008/0123762 A1 | 5/2008 | Mizusawa | |
| 2008/0267122 A1 | 10/2008 | Han et al. | |
| 2008/0303701 A1 | 12/2008 | Zhang et al. | |
| 2009/0002235 A1 | 1/2009 | Ito | |
| 2009/0028264 A1 | 1/2009 | Zhang et al. | |
| 2009/0199069 A1 | 8/2009 | Palanki et al. | |
| 2009/0202008 A1 | 8/2009 | Suzuki | |
| 2009/0247159 A1 | 10/2009 | Flore et al. | |
| 2010/0027450 A1 | 2/2010 | Montojo et al. | |
| 2010/0029320 A1 | 2/2010 | Malladi et al. | |
| 2010/0034186 A1 | 2/2010 | Zhou et al. | |
| 2010/0039928 A1 | 2/2010 | Noh et al. | |
| 2010/0074204 A1 | 3/2010 | Meylan | |
| 2010/0085934 A1 | 4/2010 | Wang et al. | |
| 2010/0103919 A1 | 4/2010 | Murakami et al. | |
| 2010/0128675 A1 | 5/2010 | Kishiyama et al. | |
| 2010/0195604 A1 | 8/2010 | Papasakellariou et al. | |
| 2010/0239041 A1 | 9/2010 | Kim et al. | |
| 2010/0246711 A1* | 9/2010 | Kishigami | H04L 5/0039 375/295 |
| 2010/0285762 A1 | 11/2010 | Ko et al. | |
| 2011/0013615 A1 | 1/2011 | Lee et al. | |
| 2011/0032973 A1* | 2/2011 | To | H04J 11/00 375/141 |
| 2011/0038266 A1 | 2/2011 | Kim et al. | |
| 2011/0085516 A1 | 4/2011 | Pajukoski et al. | |
| 2011/0096658 A1 | 4/2011 | Yang et al. | |
| 2011/0110357 A1 | 5/2011 | Chung et al. | |
| 2011/0134968 A1 | 6/2011 | Han et al. | |
| 2011/0141982 A1 | 6/2011 | Zhang et al. | |
| 2011/0142001 A1 | 6/2011 | Ko et al. | |
| 2011/0149944 A1* | 6/2011 | Ko | H04L 5/0023 370/344 |
| 2011/0171966 A1 | 7/2011 | Parkvall et al. | |
| 2011/0176622 A1* | 7/2011 | Higashinaka | H04J 11/0033 375/259 |
| 2011/0280203 A1 | 11/2011 | Han et al. | |
| 2012/0008700 A1 | 1/2012 | Dateki et al. | |
| 2012/0064834 A1 | 3/2012 | Mizusawa | |
| 2012/0093197 A1 | 4/2012 | Kim et al. | |
| 2014/0086358 A1 | 3/2014 | Han et al. | |
| 2015/0229425 A1* | 8/2015 | Takaoka | H04L 5/0041 370/307 |
| 2015/0236769 A1 | 8/2015 | Alexiou et al. | |
| 2016/0013921 A1 | 1/2016 | Nagata et al. | |

FOREIGN PATENT DOCUMENTS

| | | |
|---|---|---|
| WO | 2006/025773 A1 | 3/2006 |
| WO | 2008/088054 A1 | 7/2008 |
| WO | 2008/092387 A1 | 8/2008 |
| WO | 2008/136469 A1 | 11/2008 |

OTHER PUBLICATIONS

Grieco, "MIMO and Transmit Diversity for SC-FDMA," InterDigital, Inc., Melville, New York, Mar. 13, 2009, 11 pages.
InterDigital Communications, LLC, "Throughput evaluation of UL Transmission Schemes for LTE-A," R1-083515, Agenda Item: 11, 3GPP TSG-RAN WG1 Meeting #54bis, Prague, Czech Republic, Sep. 29-Oct. 3, 2008, 8 pages.
International Search Report, dated Dec. 15, 2009.
LG Electronics, "Uplink multiple access schemes for LTE-A," R1-083658, Agenda Item: 11, 3GPP TSG RAN WG1 #54bis, Prague, Czech, Sep. 29-Oct. 3, 2008, 12 pages.
LG Electronics, "Uplink multiple access schemes for LTE-A," R1-082945, Agenda Item: 12, 3GPP TSG RAN WG1 #54, Jeju, Korea, Aug. 18-22, 2008, 12 pages.
LG Electronics, "Proposals on the uplink access scheme for LTE-Advanced," R1-084198, Agenda Item: 11.2, 3GPP TSG RAN WG1 #55, Prague, Czech, Nov. 10-14, 2008, 3 pages.
Mehta et al., "Dynamic Resource Allocation via Clustered MC-CDMA in Multi-Service Ad-hoc Networks: Achieving Low Interference Temperature," 2nd IEEE International Symposium on New Frontiers in Dynamic Spectrum Access Networks, Apr. 17-20, 2007, 5 pages.
Motorola, "Approaches to Access Uplink Transmission Enhancements for LTE-Advanced," R1-083226, Agenda Item: 12, TSG-RAN WG1 #54, Jeju, South Korea, Aug. 18-22, 2008, 6 pages.
Motorola, "Multi-Antenna Uplink Transmission for LTE-A," R1-084403, Agenda Item: 11.2, TSG-RAN WG1 #55, Prague, Czech Republic, Nov. 10-14, 2008, 5 pages.
NEC, "Uplink Access Scheme for LTE-Advanced in BW=<20MHz," R1-083011, Agenda Item: 12, 3GPP TSG RAN1#54, Jeju, Korea, Aug. 18-22, 2008, 16 pages.
Nokia Siemens Networks, Nokia, "LTE-A-Requirements," R1-081842, Agenda Item: 6.2: LTE-A Proposals for evolution, RAN WG1 #53, Kansas City, MO, USA, May 5-9, 2008, 10 pages.

(56) References Cited

OTHER PUBLICATIONS

Nortel, "Performance Evaluation of Multi-Antenna SC-FDMA in LTE-A," R1-084471, Agenda Item: 11.2, 3GPP TSG-RAN WG1#55, Prague, Czech Republic, Nov. 10-14, 2008, 3 pages.
Nortel, "Comparison of DFTS-OFDMA with OFDMA," R1-084475, Agenda Item: 11.2, 3GPP TSG-RAN WG1#55, Prague, Czech, Nov. 10-14, 2008, 11 pages.
Office Action, dated Aug. 5, 2012, for corresponding Russian Application No. 201119495/07 (028736), 4 pages.
Office Action, dated Aug. 23, 2013, for corresponding Australian Application No. 2009315179, 3 pages.
Panasonic, "Consideration on Multicarrier Transmission scheme for LTE-Adv uplink," R1-082398, Agenda Item: 12, 3GPP TSG RAN WG1 Meeting #53bis, Warsaw, Poland, Jun. 30-Jul. 14, 2008, 3 pages.
Panasonic, "Comparison between Clustered DFT-s-OFDM and OFDM for supporting non-contiguous RB allocation within a component carrier," R1-084225, Agenda Item: 11.2, 3GPP TSG RAN WG1 Meeting#55, Prague, Czech Republic, Nov. 10-14, 2008, 7 pages.
Panasonic, "Comparison between Clustered DFT-s-OFDM and OFDM for supporting non-contiguous RB allocation within a component carrier," R1-084583, Agenda Item: 11.2, 3GPP TSG RAN WG1 Meeting #55, Prague, Czech Republic, Nov. 10-14, 2008, 7 pages.
Qualcomm Europe, "Aspects to consider for DL transmission schemes of LTE-A," R1-084398, Agenda Item: 11.3, 3GPP TSG-RAN WG1 #55, Prague, Czech Republic, Nov. 10-14, 2008, 11 pages.
Texas Instruments, "Issues on the choice of Clustered DFT-S-OFDMA versus Nx-SCFMDA," R1-084451, Agenda Item: 11.2, 3GPP TSG RAN WG1 #55, Prague, Czech Republic, Nov. 10-14, 2008, 11 pages.

* cited by examiner

| MODULATION LEVEL | NUMBER OF CLUSTERS | CLUSTER SIZE (BANDWIDTH PER CLUSTER) |
|---|---|---|
| QPSK (MODULATION LEVEL: LOW) | HIGH | NARROW |
| 16QAM (MODULATION LEVEL: MEDIUM) | MEDIUM | MEDIUM |
| 64QAM (MODULATION LEVEL: HIGH) | LOW | WIDE |

FIG. 4

| MODULATION LEVEL | CLUSTER SPACING (FREQUENCY SPACING BETWEEN CLUSTERS) |
|---|---|
| QPSK (MODULATION LEVEL: LOW) | WIDE |
| 16QAM (MODULATION LEVEL: MEDIUM) | MEDIUM |
| 64QAM (MODULATION LEVEL: HIGH) | NARROW |

FIG. 7

| CODING SIZE (THE NUMBER OF ALLOCATED RBS) | NUMBER OF CLUSTERS | CLUSTER SIZE (BANDWIDTH PER CLUSTER) |
|---|---|---|
| LARGE (THE NUMBER OF ALLOCATED RBS: HIGH) | HIGH | NARROW |
| MEDIUM (THE NUMBER OF ALLOCATED RBS: MEDIUM) | MEDIUM | MEDIUM |
| SMALL (THE NUMBER OF ALLOCATED RBS: LOW) | LOW | WIDE |

FIG.10

| CODING SIZE (THE NUMBER OF ALLOCATED RBS) | CLUSTER SPACING (FREQUENCY SPACING BETWEEN CLUSTERS) |
|---|---|
| LARGE (THE NUMBER OF ALLOCATED RBS: HIGH) | WIDE |
| MEDIUM (THE NUMBER OF ALLOCATED RBS: MEDIUM) | MEDIUM |
| SMALL (THE NUMBER OF ALLOCATED RBS: LOW) | NARROW |

FIG. 12

| CODING RATE | NUMBER OF CLUSTERS | CLUSTER SIZE (BANDWIDTH PER CLUSTER) |
|---|---|---|
| LOW | HIGH | NARROW |
| MEDIUM | MEDIUM | MEDIUM |
| HIGH | LOW | WIDE |

FIG. 14

| CODING RATE | CLUSTER SPACING (FREQUENCY SPACING BETWEEN CLUSTERS) |
| --- | --- |
| LOW | WIDE |
| MEDIUM | MEDIUM |
| HIGH | NARROW |

FIG. 15

| MODULATION LEVEL (A) | NUMBER OF CLUSTERS (X) |
|---|---|
| BPSK~QPSK | 4 |
| 8PSK~16QAM | 3 |
| 32QAM~64QAM | 2 |
| 128QAM~256QAM | 1 |

FIG.16A

| MODULATION LEVEL (A) | NUMBER OF CLUSTERS (X) | |
| | METHOD 1 | METHOD 2 |
|---|---|---|
| BPSK(A=0) | $X \leq 4$ | $2 \leq X \leq 4$ |
| QPSK(A=1) | $X \leq 4$ | $2 \leq X \leq 4$ |
| 16QAM(A=2) | $X \leq 2$ | $1 \leq X \leq 2$ |
| 64QAM(A=3) | $X \leq 1$ | $1 \leq X \leq 1$ |

FIG.16B

| MODULATION LEVEL (A) | CLUSTER SIZE (Y) | |
| --- | --- | --- |
| | METHOD 1 | METHOD 2 |
| BPSK~QPSK | $B_0 \leq Y$ OR (ARBITRARY) | $B_0 \leq Y \leq B_2$ |
| 8PSK~16QAM | $B_1 \leq Y$ | $B_1 \leq Y \leq B_4$ |
| 32QAM~64QAM | $B_2 \leq Y$ | $B_3 \leq Y \leq B_6$ |
| 128QAM~256QAM | $B_3 \leq Y$ | $B_5 \leq Y$ |

FIG.16C

| MODULATION LEVEL (A) | CLUSTER SIZE (Y) |
| --- | --- |
| BPSK(A=0) | $B/X_0 \leq Y$ OR (ARBITRARY) |
| QPSK(A=1) | $B/X_1 = Y$ |
| 16QAM(A=2) | $B/X_2 = Y$ |
| 64QAM(A=3) | $B/X_3 = Y$ |

FIG.16D

| MODULATION LEVEL (A) | CLUSTER SPACING (Z) |
| --- | --- |
| BPSK~QPSK | $Z \leq B'_0$ OR (ARBITRARY) |
| 8PSK~16QAM | $Z \leq B'_1$ |
| 32QAM~64QAM | $Z \leq B'_2$ |
| 128QAM~256QAM | $Z \leq B'_3$ |

FIG.16E

| CODING SIZE (N) | NUMBER OF CLUSTERS (X) |
|---|---|
| ~100 | 1 |
| 101~500 | 2 |
| 501~1000 | 3 |
| 1001~ | 4 |

FIG.17A

| CODING SIZE (N) | CLUSTER SIZE (Y) | |
|---|---|---|
| | METHOD 1 | METHOD 2 |
| ~100 | $B_3 \leq Y$ | $B_5 \leq Y$ |
| 101~500 | $B_2 \leq Y$ | $B_3 \leq Y \leq B_6$ |
| 501~1000 | $B_1 \leq Y$ | $B_1 \leq Y \leq B_4$ |
| 1001~ | $B_0 \leq Y$ OR (ARBITRARY) | $B_0 \leq Y \leq B_2$ |

FIG.17B

| CODING SIZE (N) | CLUSTER SIZE (Y) |
|---|---|
| ~100 | $B/X_0 = Y$ |
| 101~500 | $B/X_1 = Y$ |
| 501~1000 | $B/X_2 = Y$ |
| 1001~ | $B/X_3 \leq Y$ OR (ARBITRARY) |

FIG.17C

| CODING SIZE (N) | CLUSTER SPACING (Z) |
|---|---|
| ~100 | $Z \leq B'_3$ |
| 101~500 | $Z \leq B'_2$ |
| 501~1000 | $Z \leq B'_1$ |
| 1001~ | $Z \leq B'_0$ OR (ARBITRARY) |

FIG.17D

| CODING RATE (R) | NUMBER OF CLUSTERS (X) |
|---|---|
| $R \leq 1/3$ | 4 |
| $1/3 < R \leq 1/2$ | 3 |
| $1/2 < R \leq 2/3$ | 2 |
| $2/3 < R$ | 1 |

FIG.18A

| CODING RATE (R) | CLUSTER SIZE (Y) | |
|---|---|---|
| | METHOD 1 | METHOD 2 |
| $R \leq 1/3$ | $B_0 \leq Y$ OR (ARBITRARY) | $B_0 \leq Y \leq B_2$ |
| $1/3 < R \leq 1/2$ | $B_1 \leq Y$ | $B_1 \leq Y \leq B_4$ |
| $1/2 < R \leq 2/3$ | $B_2 \leq Y$ | $B_3 \leq Y \leq B_6$ |
| $2/3 < R$ | $B_3 \leq Y$ | $B_5 \leq Y$ |

FIG.18B

| CODING RATE (R) | CLUSTER SIZE (Y) |
|---|---|
| $R \leq 1/3$ | $B/X_0 \leq Y$ OR (ARBITRARY) |
| $1/3 < R \leq 1/2$ | $B/X_1 = Y$ |
| $1/2 < R \leq 2/3$ | $B/X_2 = Y$ |
| $2/3 < R$ | $B/X_3 = Y$ |

FIG.18C

| CODING RATE (R) | CLUSTER SPACING (Z) |
|---|---|
| $R \leq 1/3$ | $Z \leq B'_0$ OR (ARBITRARY) |
| $1/3 < R \leq 1/2$ | $Z \leq B'_1$ |
| $1/2 < R \leq 2/3$ | $Z \leq B'_2$ |
| $2/3 < R$ | $Z \leq B'_3$ |

FIG.18D

| MCS SET | MODULATION LEVEL (A) | CODING RATE (R) | NUMBER OF CLUSTERS (X) |
|---|---|---|---|
| 0 | QPSK | 1/8 | 4 |
| 1 | QPSK | 1/3 | 3 |
| 2 | QPSK | 1/2 | 3 |
| 3 | 16QAM | 1/3 | 2 |
| 4 | 16QAM | 1/2 | 2 |
| 5 | 16QAM | 2/3 | 1 |
| 6 | 64QAM | 1/2 | 1 |
| 7 | 64QAM | 2/3 | 1 |

FIG.19A

| MCS SET | MODULATION LEVEL (A) | CODING RATE (R) | CLUSTER SIZE (Y) | |
|---|---|---|---|---|
| | | | METHOD 1 | METHOD 2 |
| 0 | QPSK | 1/8 | $B_0 \leq Y$ OR (ARBITRARY) | $B_0 \leq Y \leq B_2$ |
| 1 | QPSK | 1/3 | $B_1 \leq Y$ | $B_1 \leq Y \leq B_4$ |
| 2 | QPSK | 1/2 | $B_2 \leq Y$ | $B_3 \leq Y \leq B_6$ |
| 3 | 16QAM | 1/3 | $B_3 \leq Y$ | $B_5 \leq Y \leq B_8$ |
| 4 | 16QAM | 1/2 | $B_4 \leq Y$ | $B_7 \leq Y \leq B_{10}$ |
| 5 | 16QAM | 2/3 | $B_5 \leq Y$ | $B_9 \leq Y \leq B_{12}$ |
| 6 | 64QAM | 1/2 | $B_6 \leq Y$ | $B_{11} \leq Y \leq B_{14}$ |
| 7 | 64QAM | 2/3 | $B_7 \leq Y$ | $B_{13} \leq Y$ |

FIG.19B

| MCS SET | MODULATION LEVEL (A) | CODING RATE (R) | CLUSTER SPACING (Z) |
|---|---|---|---|
| 0 | QPSK | 1/8 | $Z \leq B'_0$ OR (ARBITRARY) |
| 1 | QPSK | 1/3 | $Z \leq B'_1$ |
| 2 | QPSK | 1/2 | $Z \leq B'_2$ |
| 3 | 16QAM | 1/3 | $Z \leq B'_3$ |
| 4 | 16QAM | 1/2 | $Z \leq B'_4$ |
| 5 | 16QAM | 2/3 | $Z \leq B'_5$ |
| 6 | 64QAM | 1/2 | $Z \leq B'_6$ |
| 7 | 64QAM | 2/3 | $Z \leq B'_7$ |

FIG.19C

| RANK INDEX | NUMBER OF CLUSTERS | CLUSTER SIZE (BANDWIDTH PER CLUSTER) |
|---|---|---|
| LOW | HIGH | NARROW |
| MEDIUM | MEDIUM | MEDIUM |
| HIGH | LOW | WIDE |

FIG.22

| RANK INDEX | CLUSTER SPACING (FREQUENCY SPACING BETWEEN CLUSTERS) |
|---|---|
| LOW | WIDE |
| MEDIUM | MEDIUM |
| HIGH | NARROW |

FIG. 24

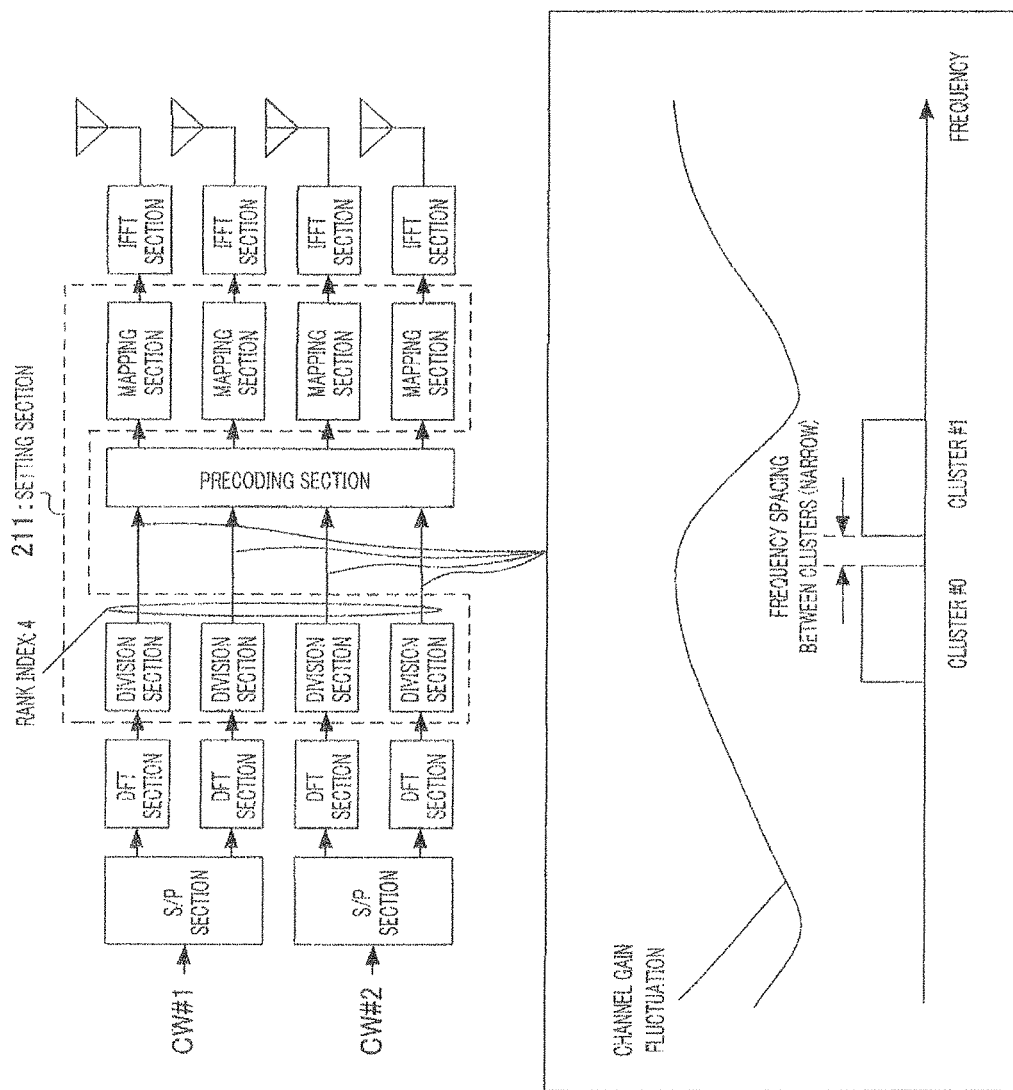

| TRANSMISSION RATE (MCS SET) | NUMBER OF CLUSTERS | CLUSTER SIZE (BANDWIDTH PER CLUSTER) |
|---|---|---|
| LOW | HIGH | NARROW |
| MEDIUM | MEDIUM | MEDIUM |
| HIGH | LOW | WIDE |

FIG.28

| TRANSMISSION RATE (MCS SET) | CLUSTER SPACING (FREQUENCY SPACING BETWEEN CLUSTERS) |
|---|---|
| LOW | WIDE |
| MEDIUM | MEDIUM |
| HIGH | NARROW |

FIG.30

| RANK INDEX (RI) | NUMBER OF CLUSTERS (X) |
|---|---|
| 1 | 4 |
| 2 | 3 |
| 3 | 2 |
| 4 | 1 |

FIG.32A

| RANK INDEX (RI) | NUMBER OF CLUSTERS (X) | |
|---|---|---|
| | METHOD 1 | METHOD 2 |
| 1 | $X \leq 4$ | $2 \leq X \leq 4$ |
| 2 | $X \leq 3$ | $2 \leq X \leq 3$ |
| 3 | $X \leq 2$ | $1 \leq X \leq 2$ |
| 4 | $X \leq 1$ | $1 \leq X \leq 1$ |

FIG.32B

| RANK INDEX (RI) | CLUSTER SIZE (Y) | |
| --- | --- | --- |
| | METHOD 1 | METHOD 2 |
| 1~2 | $B_0 \leq Y$ OR (ARBITRARY) | $B_0 \leq Y \leq B_2$ |
| 3~4 | $B_1 \leq Y$ | $B_1 \leq Y \leq B_4$ |
| 5~6 | $B_2 \leq Y$ | $B_3 \leq Y \leq B_6$ |
| 7~8 | $B_3 \leq Y$ | $B_5 \leq Y$ |

FIG.32C

| RANK INDEX (RI) | CLUSTER SIZE (Y) |
| --- | --- |
| 1 | $B/X_0 \leq Y$ OR (ARBITRARY) |
| 2 | $B/X_1 = Y$ |
| 3 | $B/X_2 = Y$ |
| 4 | $B/X_3 = Y$ |

FIG.32D

| RANK INDEX (RI) | CLUSTER SPACING (Z) |
| --- | --- |
| 1 | $Z \leq B'_0$ OR (ARBITRARY) |
| 2 | $Z \leq B'_1$ |
| 3 | $Z \leq B'_2$ |
| 4 | $Z \leq B'_3$ |

FIG.32E

BASE STATION APPARATUS AND RESOURCE ALLOCATION METHOD

TECHNICAL FIELD

The present invention relates to a radio communication terminal apparatus, a radio communication base station apparatus and a cluster arrangement setting method.

BACKGROUND ART

In 3GPP LTE (3rd Generation Partnership Project Long Term Evolution), studies are being actively carried out on the standardization of mobile communication standards in order to realize low-delay and high-speed transmission.

To realize low-delay and high-speed transmission, OFDM (Orthogonal Frequency Division Multiplexing) is adopted as a downlink (DL) multiple access scheme, while SC-FDMA (Single-Carrier Frequency Division Multiple Access) using DFT (Discrete Fourier Transform) precoding is adopted as an uplink (UL) multiple access scheme. SC-FDMA using DFT precoding forms an SC-FDMA signal (spectrum) by spreading and code-multiplexing a symbol sequence using a DFT matrix (precoding matrix or DFT sequence).

Furthermore, standardization of LTE-Advanced (or IMT (International Mobile Telecommunication)-Advanced) that realizes still higher speed communication than LTE has been started. LTE-Advanced is expected to introduce a radio communication base station apparatus (hereinafter referred to as "base station") and a radio communication terminal apparatus (hereinafter referred to as "terminal") capable of communicating at wideband frequencies to realize higher speed communication.

In order to maintain single carrier characteristics (e.g. low PAPR (Peak-to-Average Power Ratio) characteristics) of a transmission signal for realizing high coverage on an LTE uplink, allocation of frequency resources on the uplink is limited to allocation whereby an SC-FDMA signal is mapped in a localized manner to continuous frequency bands.

However, when allocation of frequency resources is limited as described above, vacant resources are produced in uplink shared frequency resources (e.g. PUSCH (Physical Uplink Shared CHannel)) and the efficiency of use of frequency resources in the system band deteriorates, resulting in deterioration of system throughput. Thus, clustered SC-FDMA (C-SC-FDMA) is proposed as a prior art for improving system throughput whereby an SC-FDMA signal is divided into a plurality of clusters and the plurality of clusters are mapped to discontinuous frequency resources (e.g. see Non-Patent Literature 1).

According to C-SC-FDMA, a base station compares the states of availability of frequency resources (subcarriers or resources blocks (RB)) of a plurality of uplinks or channel quality information (e.g. CQI: Channel Quality Indicator) between a plurality of terminals and the base station. The base station divides an SC-FDMA signal (spectrum) of each terminal by an arbitrary bandwidth according to the level of CQI between each terminal and the base station and thereby generates a plurality of clusters. The base station then allocates the plurality of clusters generated to frequency resources of a plurality of uplinks and reports information indicating the allocation results to the terminals. The terminal divides the SC-FDMA signal (spectrum) by an arbitrary bandwidth, maps the plurality of clusters to the frequency resources of the plurality of uplinks allocated by the base station and thereby generates a C-SC-FDMA signal. The base station applies frequency domain equalization (FDE) processing to the received C-SC-FDMA signal (a plurality of clusters) and combines the plurality of clusters after the equalization processing. The base station then applies IDFT (Inverse Discrete Fourier Transform) processing to the combined signal to obtain a time domain signal.

C-SC-FDMA maps a plurality of clusters to a plurality of discontinuous frequency resources, and can thereby perform frequency resource allocation among a plurality of terminals more flexibly than SC-FDMA. Thus, C-SC-FDMA can improve the multiuser diversity effect and can improve the system throughput in consequence (e.g. see Non-Patent Literature 2).

CITATION LIST

Non-Patent Literature

NPL 1

R1-081842, "LTE-A Proposals for evolution," 3GPP RAN WG1 #53, Kansas City, Mo., USA, May 5-9, 2008

NPL 2

R1-083011, "Uplink Access Scheme for LTE-Advanced in BW=<20 MHz," 3GPP RAN WG1 #54, Jeju, Korea, Aug. 18-22, 2008

SUMMARY OF INVENTION

Technical Problem

To realize higher speed communication than LTE, it is necessary to improve not only system throughput but also user throughput per terminal on an LTE-Advanced uplink more than user throughput per terminal on an LTE uplink.

However, an uplink wide radio frequency band (wideband radio channel) has frequency selectivity, and this reduces the frequency correlation between channels through which a plurality of clusters which are mapped to different discontinuous frequency bands propagate. Thus, even when the base station equalizes a C-SC-FDMA signal (a plurality of clusters) through equalization processing, the equalized channel gain per a plurality of clusters (that is, the frequency channel gain multiplied by an FDE weight) may possibly differ significantly. Thus, the equalized channel gain may drastically change at combining points of the plurality of clusters (that is, division points at which the terminal divides the SC-FDMA signal). That is, discontinuous points are produced in a fluctuation of the equalized channel gain at the combining points of the plurality of clusters (that is, envelope of reception spectrum).

Here, maintaining the loss of orthogonality of the DFT matrix minimal in all frequency bands (that is, the sum of frequency bands to which the plurality of clusters are mapped) to which the C-SC-FDMA signal is mapped requires the fluctuation of the equalized channel gain to be moderate in all frequency bands to which the plurality of clusters are mapped. Therefore, as descried above, when discontinuous points are produced in the fluctuation of the equalized channel gain at the combining points of the plurality of clusters, the loss of orthogonality of the DFT matrix increases in frequency bands to which the C-SC-FDMA signal is mapped. Thus, the C-SC-FDMA signal is more susceptible to the influence of interference between codes (Inter-Symbol Interference: ISI) caused by the loss of orthogonality of the DFT matrix. Furthermore, as the number of clusters (the number of divisions of the SC-FDMA signal) increases, the number of combining points of the plurality of clusters (discontinuous points) increases, and therefore ISI caused by the loss of orthogonality of the DFT matrix increases. That is, as the number of clusters (the number of divisions of the SC-FDMA signal) increases, transmission characteristics deteriorate more significantly.

Furthermore, an MCS (Modulation and channel Coding Scheme) set (coding rate and modulation level) corresponding to channel quality of the uplink of each terminal or transmission parameters such as coding size are set in the SC-FDMA signal transmitted by each terminal. However, the robustness against ISI caused by the loss of orthogonality of the DFT matrix (reception sensitivity), that is, the magnitude of allowable ISI differs from one transmission parameter to another set in the SC-FDMA signal. For example, when attention is focused on a modulation level indicated in the MCS set as a transmission parameter, a modulation scheme of a higher modulation level such as the modulation scheme of 64 QAM having a very small Euclidean distance between signal points is more susceptible to the influence of ISI. That is, even when ISI of the same magnitude occurs, whether the ISI is allowable or not (that is, whether the ISI is within a range of allowable ISI or not) differs depending on the modulation level set in the SC-FDMA signal (that is, transmission parameter such as MCS set or coding size). In the case where ISI greater than the allowable ISI of a transmission parameter (MCS set or coding size) set in the SC-FDMA signal is produced, transmission characteristics deteriorate and the user throughput of the terminal in which the transmission parameter is set deteriorates.

Thus, when the SC-FDMA signal is divided by an arbitrary bandwidth only according to a CQI between the base station and each terminal as with the above described prior art and a plurality of clusters are mapped to discontinuous frequency bands, although the system throughput is improved, influences of ISI on the transmission characteristics vary depending on the differences in transmission parameters (MCS set or coding size) set in the SC-FDMA signal and the user throughput is not improved.

It is therefore an object of the present invention to provide a radio communication terminal apparatus, a radio communication base station apparatus and a cluster arrangement setting method capable of improving user throughput while maintaining the effect of improving system throughput when an SC-FDMA signal is divided into a plurality of clusters and the plurality of clusters are mapped to discontinuous frequency bands, that is, even when C-SC-FDMA is used.

Solution to Problem

A radio communication terminal apparatus of the present invention adopts a configuration including a transformation section that applies DFT processing to a time domain symbol sequence and generates a frequency domain signal and a setting section that divides the signal into a plurality of clusters in accordance with a cluster pattern corresponding to an MCS set that is set in the signal, a coding size that is set in the signal or a rank index during MIMO transmission, maps the plurality of clusters to a plurality of discontinuous frequency resources and thereby determines an arrangement of the plurality of clusters in a frequency domain.

A radio communication base station apparatus of the present invention adopts a configuration including a control section that determines a cluster pattern of a signal from a radio communication terminal apparatus according to an MCS set that is set in the signal, a coding size that is set in the signal or a rank index during MIMO transmission, and a reporting section that reports the cluster pattern to the radio communication terminal apparatus.

A cluster arrangement setting method of the present invention divides a frequency domain signal generated by applying DFT processing to a time domain symbol sequence into a plurality of clusters in accordance with a cluster pattern corresponding to an MCS set that is set in the signal, a coding size that is set in the signal or a rank index during MIMO transmission, maps the plurality of clusters to a plurality of discontinuous frequency resources and thereby determines an arrangement of the plurality of clusters.

Advantageous Effects of Invention

According to the present invention, even when an SC-FDMA signal is divided into a plurality of clusters and the plurality of clusters are mapped to discontinuous frequency bands (when C-SC-FDMA is used), it is possible to improve user throughput while maintaining the effect of improving system throughput.

BRIEF DESCRIPTION OF DRAWINGS

FIG. 4 is a diagram illustrating an association between a modulation level and the number of clusters or cluster size according to Embodiment 1 of the present invention;

FIG. 7 is a diagram illustrating an association between a modulation level and a cluster spacing according to Embodiment 1 of the present invention;

FIG. 10 is a diagram illustrating an association between a coding size and the number of clusters or cluster size according to Embodiment 1 of the present invention;

FIG. 12 is a diagram illustrating an association between a coding size and a cluster spacing according to Embodiment 1 of the present invention;

FIG. 14 is a diagram illustrating an association between a coding rate and the number of clusters or cluster size according to Embodiment 1 of the present invention;

FIG. 15 is a diagram illustrating an association between a coding size and a cluster spacing according to Embodiment 1 of the present invention;

FIG. 16A is a diagram illustrating an association between a modulation level and the number of clusters according to a variation of Embodiment 1 of the present invention;

FIG. 16B is a diagram illustrating an association between a modulation level and the number of clusters according to a variation of Embodiment 1 of the present invention;

FIG. 16C is a diagram illustrating an association between a modulation level and a cluster size according to a variation of Embodiment 1 of the present invention;

FIG. 16D is a diagram illustrating an association between a modulation level and a cluster size according to a variation of Embodiment 1 of the present invention;

FIG. 16E is a diagram illustrating an association between a modulation level and a cluster spacing according to a variation of Embodiment 1 of the present invention;

FIG. 17A is a diagram illustrating an association between a coding size and the number of clusters according to a variation of Embodiment 1 of the present invention;

FIG. 17B is a diagram illustrating an association between a coding size and a cluster size according to a variation of Embodiment 1 of the present invention;

FIG. 17C is a diagram illustrating an association between a coding size and a cluster size according to a variation of Embodiment 1 of the present invention;

FIG. 17D is a diagram illustrating an association between a coding size and a cluster spacing according to a variation of Embodiment 1 of the present invention;

FIG. 18A is a diagram illustrating an association between a coding rate and the number of clusters according to a variation of Embodiment 1 of the present invention;

FIG. 18B is a diagram illustrating an association between a coding size and a cluster size according to a variation of Embodiment 1 of the present invention;

FIG. 18C is a diagram illustrating an association between a coding size and a cluster size according to a variation of Embodiment 1 of the present invention;

FIG. 18D is a diagram illustrating an association between a coding size and a cluster spacing according to a variation of Embodiment 1 of the present invention;

FIG. 19A is a diagram illustrating an association between an MCS set and the number of clusters according to a variation of Embodiment 1 of the present invention;

FIG. 19B is a diagram illustrating an association between an MCS set and a cluster size according to a variation of Embodiment 1 of the present invention;

FIG. 19C is a diagram illustrating an association between an MCS set and a cluster spacing according to a variation of Embodiment 1 of the present invention;

FIG. 22 is a diagram illustrating an association between a rank index and the number of clusters or cluster size according to Embodiment 2 of the present invention;

FIG. 24 is a diagram illustrating an association between a rank index and a cluster spacing according to Embodiment 2 of the present invention;

FIG. 25B is a diagram illustrating a method of setting a cluster arrangement according to Embodiment 2 of the present invention (when the rank index is large);

FIG. 28 is a diagram illustrating an association between a transmission rate (MCS set) and the number of clusters or cluster size according to Embodiment 2 of the present invention;

FIG. 30 is a diagram illustrating an association between a transmission rate (MCS set) and a cluster spacing according to Embodiment 2 of the present invention;

FIG. 31 is a diagram illustrating a method of setting a cluster arrangement according to Embodiment 2 of the present invention;

FIG. 32A is a diagram illustrating an association between a rank index and the number of clusters according to a variation of Embodiment 2 of the present invention;

FIG. 32B is a diagram illustrating an association between a rank index and the number of clusters according to a variation of Embodiment 2 of the present invention;

FIG. 32C is a diagram illustrating an association between a rank index and a cluster size according to a variation of Embodiment 2 of the present invention;

FIG. 32D is a diagram illustrating an association between a rank index and a cluster size according to a variation of Embodiment 2 of the present invention; and FIG. 32E is a diagram illustrating an association between a rank index and a cluster spacing according to a variation of Embodiment 2 of the present invention.

DESCRIPTION OF EMBODIMENTS

Hereinafter, embodiments of the present invention will be described in detail with reference to the accompanying drawings.

Embodiment 1

Figure 1:
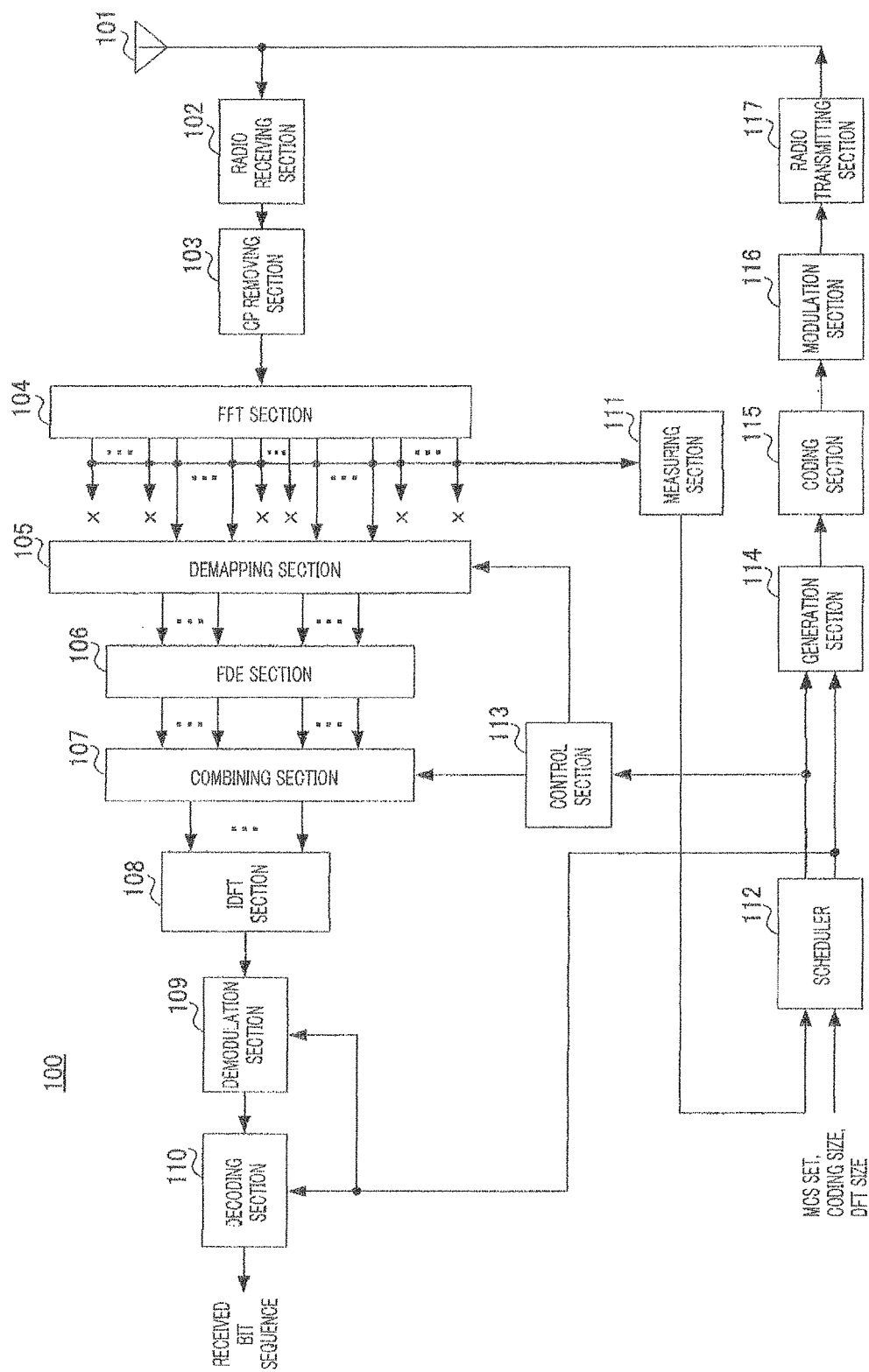
FIG. 1 is a block configuration diagram of a base station according to Embodiment 1 of the present invention.

FIG. 1 shows a configuration of base station 100 according to the present embodiment.

In base station 100, radio receiving section 102 receives a C-SC-FDMA signal transmitted from each terminal via antenna 101 and applies reception processing such as down-conversion and A/D conversion to the C-SC-FDMA signal. Radio receiving section 102 then outputs the C-SC-FDMA signal subjected to the reception processing to CP (Cyclic Prefix) removing section 103.

CP removing section 103 removes a CP added to the head of the C-SC-FDMA signal inputted from radio receiving section 102.

FFT (Fast Fourier Transform) section 104 performs FFT to the C-SC-FDMA signal inputted from CP removing section 103 to transform the signal into frequency domain C-SC-FDMA signals (subcarrier components). FFT section 104 then outputs the frequency domain C-SC-FDMA signals (subcarrier components) to demapping section 105. Furthermore, FFT section 104 outputs the subcarrier components including a pilot signal to measuring section 111.

Demapping section 105 extracts C-SC-FDMA signals corresponding to frequency resources (subcarriers or RBs) used by the respective terminals from the C-SC-FDMA signals inputted from FFT section 104 based on mapping information inputted from control section 113. Demapping section 105 then outputs the extracted C-SC-FDMA signal to FDE section 106.

FDE section 106 equalizes the C-SC-FDMA signals inputted from demapping section 105 using FDE weights calculated based on estimate values of frequency fluctuations in channels between the base station and the respective terminals estimated by an estimation section (not shown). FDE section 106 then outputs the equalized signal to combining section 107.

Combining section 107 combines a plurality of clusters making up the C-SC-FDMA signals inputted from FDE section 106 in a frequency domain based on the number of clusters (a plurality of clusters obtained by dividing the C-SC-FDMA signal), bandwidth per cluster (hereinafter referred to as "cluster size") and frequency spacing between clusters inputted from control section 113. Combining section 107 then outputs the combined C-SC-FDMA signal to IDFT section 108.

IDFT section 108 generates a time domain signal by applying IDFT processing to the C-SC-FDMA signals inputted from combining section 107. IDFT section 108 then outputs the generated time domain signal to demodulation section 109.

Demodulation section 109 demodulates the signal inputted from IDFT section 108 based on MCS information (modulation level) inputted from scheduler 112 and outputs the demodulated signal to decoding section 110.

Decoding section 110 decodes the signal inputted from demodulation section 109 based on the MCS information (coding rate) and coding size inputted from scheduler 112 and outputs the decoded signal as a received bit sequence.

On the other hand, measuring section 111 measures an SINR (Signal-to-Interference plus Noise power Ratio) per frequency band (subcarrier) between each terminal and the base station using a pilot signal (pilot signal transmitted from each terminal) included in subcarrier components inputted from FFT section 104 and thereby generates channel quality information (e.g. CQI) of each terminal. Measuring section 111 then outputs a CQI of each terminal to scheduler 112.

Scheduler 112 receives as input, an MCS set (modulation level (modulation scheme) and coding rate) set in the signal of each terminal, coding size (code block size) set in the signal of each terminal and DFT size (the number of DFT points) used in DFT section 210 (FIG. 2) of terminal 200 which will be described later. First, scheduler 112 calculates priority in allocation of uplink frequency resources (PUSCH) corresponding to each terminal. Scheduler 112 schedules allocation of uplink frequency resources (PUSCH) of each terminal using priority of each terminal and a CQI of each terminal inputted from measuring section 111.

To be more specific, scheduler 112 determines a cluster pattern of the signal (C-SC-FDMA signal) from each terminal according to an MCS set (modulation level and coding rate) set in the signal (C-SC-FDMA signal) from each terminal or coding size set in the signal (C-SC-FDMA signal) from each terminal. Here, the cluster pattern is represented by the number of clusters, cluster size or cluster spacing. That is, scheduler 112 functions as a determining section that determines a cluster pattern (the number of clusters, cluster size or cluster spacing) according to the MCS set or coding size.

Scheduler 112 then outputs frequency resource information indicating the result of allocation of uplink frequency resources of each terminal (that is, the scheduling result of frequency resource allocation based on the determined cluster spacing) and spectrum division information indicating the number of clusters and cluster size of clusters making up the C-SC-FDMA signal transmitted by each terminal to control section 113 and generation section 114. This causes a cluster pattern indicating the number of clusters, cluster size or cluster spacing to be reported to each terminal. Furthermore, scheduler 112 outputs control information including MCS information indicating the MCS set (modulation scheme and coding rate) set in each terminal and the coding size set in each terminal to demodulation section 109, decoding section 110 and generation section 114.

Control section 113 calculates the number of clusters, cluster size and cluster spacing based on the spectrum division information and frequency resource information inputted from scheduler 112. Furthermore, control section 113 calculates frequency resources to which the C-SC-FDMA signal (a plurality of clusters) of each terminal is mapped based on the calculated number of clusters, cluster size and cluster spacing. Control section 113 then inputs the calculated number of clusters, cluster size and cluster spacing to combining section 107 and outputs mapping information indicating the frequency resources to which the C-SC-FDMA signal (a plurality of clusters) of each terminal is mapped to demapping section 105.

Generation section 114 generates a control signal by converting the spectrum division information, frequency resource information and control information inputted from scheduler 112 to a binary control bit sequence to be reported to each terminal. Generation section 114 outputs the control signal generated to coding section 115.

Coding section 115 encodes the control signal inputted from generation section 114 and outputs the encoded control signal to modulation section 116.

Modulation section 116 modulates the control signal inputted from coding section 115 and outputs the modulated control signal to radio transmitting section 117.

Radio transmitting section 117 applies transmission processing such as D/A conversion, amplification and up-conversion to the control signal inputted from modulation section 116 and transmits the signal subjected to the transmission processing to each terminal via antenna 101.

Figure 2:
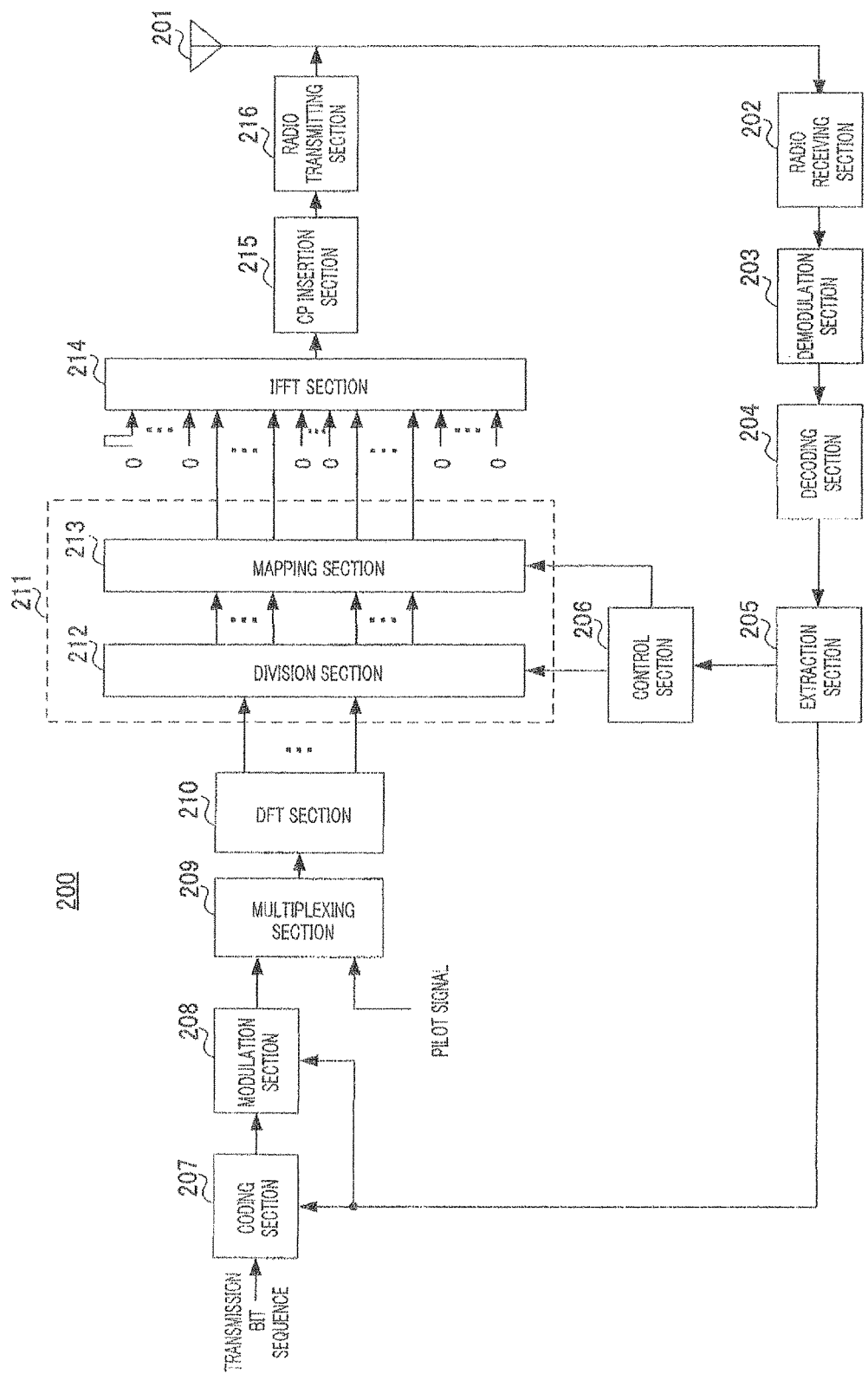
FIG. 2 is a block configuration diagram of a terminal according to Embodiment 1 of the present invention.

Next, FIG. 2 shows a configuration of terminal 200 according to the present embodiment.

In terminal 200, radio receiving section 202 receives a control signal transmitted from base station 100 (FIG. 1) via antenna 201 and applies reception processing such as down-conversion and A/D conversion to the control signal. Radio receiving section 202 then outputs the control signal subjected to the reception processing to demodulation section 203. This control signal includes spectrum division information indicating the number of divisions of a signal transmitted by each terminal (that is, the number of clusters) and cluster size, frequency resource information indicating uplink frequency resources allocated to each terminal and control information indicating MCS information and coding size or the like.

Demodulation section 203 demodulates the control signal and outputs the demodulated control signal to decoding section 204.

Decoding section 204 decodes the control signal and outputs the decoded control signal to extraction section 205.

Extraction section 205 extracts the spectrum division information and frequency resource information directed to the terminal included in the control signal inputted from decoding section 204 and outputs the extracted spectrum division information and frequency resource information to control section 206. Furthermore, extraction section 205 outputs the MCS information directed to the terminal and coding size indicated in the control information included in the control signal inputted from decoding section 204 to coding section 207 and modulation section 208.

Control section 206 calculates the number of clusters of an C-SC-FDMA signal generated by dividing the SC-FDMA signal (that is, output of DFT section 210) and cluster size based on the spectrum division information and frequency resource information inputted from extraction section 205. Furthermore, control section 206 calculates frequency resources to which the C-SC-FDMA signal (a plurality of clusters) is mapped based on frequency resource information and the calculated number of clusters and cluster size, and thereby identifies the cluster spacing of clusters making up the C-SC-FDMA signal. That is, control section 206 calculates the cluster pattern (the number of clusters, cluster size and cluster spacing) reported from base station 100. Control section 206 then outputs the calculated cluster pattern to setting section 211. To be more specific, control section 206 outputs the calculated number of clusters and cluster size to division section 212 of setting section 211 and outputs mapping information indicating frequency resources to which the C-SC-FDMA signal (a plurality of clusters) of the terminal is mapped (that is, information indicating the cluster spacing) to mapping section 213 of setting section 211.

When the SC-FDMA signal (spectrum) is divided into a plurality of clusters, suppose it is predetermined between the base station and the terminal that the SC-FDMA signal (spectrum) will be divided in order from a lower frequency part of the spectrum (from a lower output number of DFT section 210) or from a higher frequency part of the spectrum (from a higher output number of DFT section 210). For example, of a plurality of clusters generated through the division, control section 206 calculates frequency resources to which the clusters are mapped in order from a cluster of a lower frequency (cluster of a lower output number of DFT section 210) or from a cluster of a higher frequency (cluster of a higher output number of DFT section 210).

Coding section 207 encodes a transmission bit sequence based on the MCS information (coding rate) and coding size inputted from extraction section 205 and outputs the encoded transmission bit sequence to modulation section 208.

Modulation section 208 generates a symbol sequence by modulating the transmission bit sequence inputted from coding section 207 based on the MCS information (modulation level) inputted from extraction section 205 and outputs the generated symbol sequence to multiplexing section 209.

Multiplexing section 209 multiplexes a pilot signal and the symbol sequence inputted from modulation section 208. Multiplexing section 209 outputs the symbol sequence with which a pilot signal is multiplexed to DFT section 210. For example, a CAZAC (Constant Amplitude Zero Auto Correlation) sequence may also be used as the pilot signal. Furthermore, FIG. 2 shows a configuration in which a pilot signal and a symbol sequence are multiplexed before DFT processing, but a configuration may also be adopted in which a pilot signal is multiplexed with a symbol sequence after the DFT processing.

DFT section 210 applies DFT processing to the time domain symbol sequence inputted from multiplexing section 209 and generates a frequency domain signal (SC-FDMA signal). DFT section 210 then outputs the SC-FDMA signal (spectrum) generated to division section 212 of setting section 211.

Setting section 211 is provided with division section 212 and mapping section 213. Setting section 211 divides the SC-FDMA signal (spectrum) inputted from DFT section 210 into a plurality of clusters in accordance with a cluster pattern inputted from control section 206, maps the plurality of clusters to discontinuous frequency resources respectively and thereby determines an arrangement of the C-SC-FDMA signal (a plurality of clusters) in the frequency domain. Setting section 211 outputs the C-SC-FDMA signal (a plurality of clusters) generated to IFFT (Inverse Fast Fourier Transform) section 214. Hereinafter, an internal configuration of setting section 211 will be described.

Division section 212 of setting section 211 divides the SC-FDMA signal (spectrum) inputted from DFT section 210 into a plurality of clusters according to the number of clusters and cluster size indicated in the cluster information inputted from control section 206. Division section 212 then outputs the C-SC-FDMA signal made up of the plurality of clusters generated to mapping section 213.

Mapping section 213 of setting section 211 maps the C-SC-FDMA signal (a plurality of clusters) inputted from division section 212 to frequency resources (subcarriers or RBs) based on mapping information (information indicating the cluster spacing) inputted from control section 206. Mapping section 213 then outputs the C-SC-FDMA signal mapped to the frequency resources to IFFT section 214.

IFFT section 214 performs IFFT on the plurality of frequency bands (subcarriers) to which the C-SC-FDMA signal inputted from mapping section 213 is mapped and generates a time domain C-SC-FDMA signal. Here, IFFT section 214 inserts 0s into frequency bands (subcarriers) other than the plurality of frequency bands (subcarriers) to which the C-SC-FDMA signal (a plurality of clusters) is mapped. IFFT section 214 then outputs the time domain C-SC-FDMA signal to CP insertion section 215.

CP insertion section 215 adds the same signal as the rear portion of the C-SC-FDMA signal inputted from IFFT section 214 to the head of the C-SC-FDMA signal as a CP.

Radio transmitting section 216 applies transmission processing such as D/A conversion, amplification and up-conversion to the C-SC-FDMA signal and transmits the signal subjected to the transmission processing to base station 100 (FIG. 1) via antenna 201.

Next, details of cluster pattern determining processing by base station 100 and cluster arrangement setting processing (that is, division processing of the SC-FDMA signal (spectrum) and mapping processing on the plurality of clusters) by terminal 200 will be described.

Figure 3A:
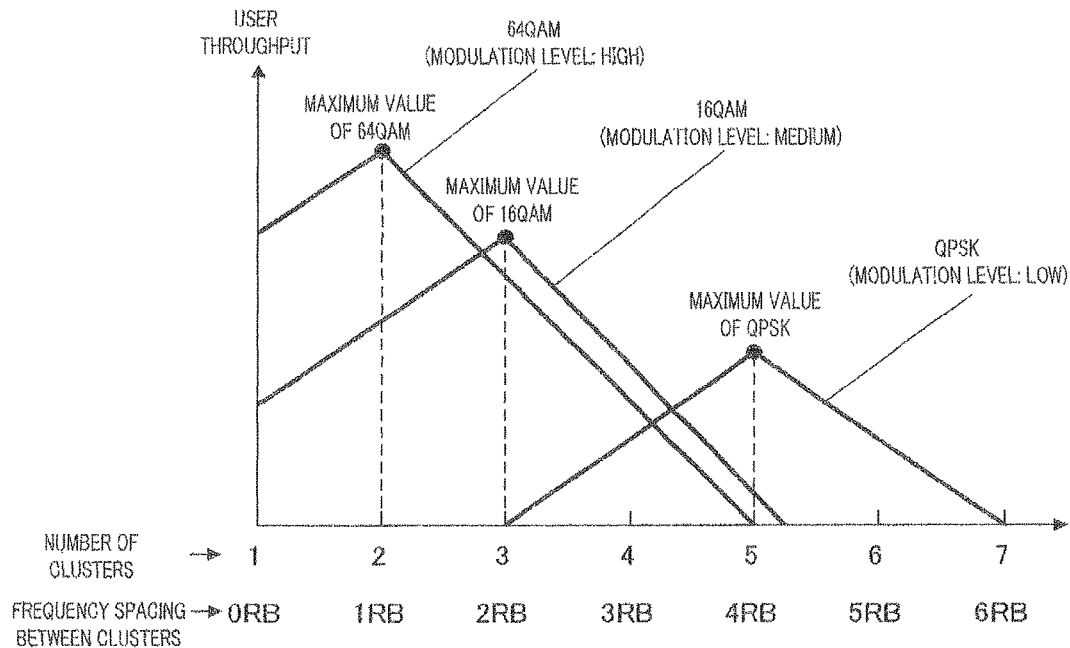
FIG. 3A is a diagram illustrating a relationship between the number of clusters (cluster spacing) and user throughput according to Embodiment 1 of the present invention (when SNR is high)
Figure 3B:
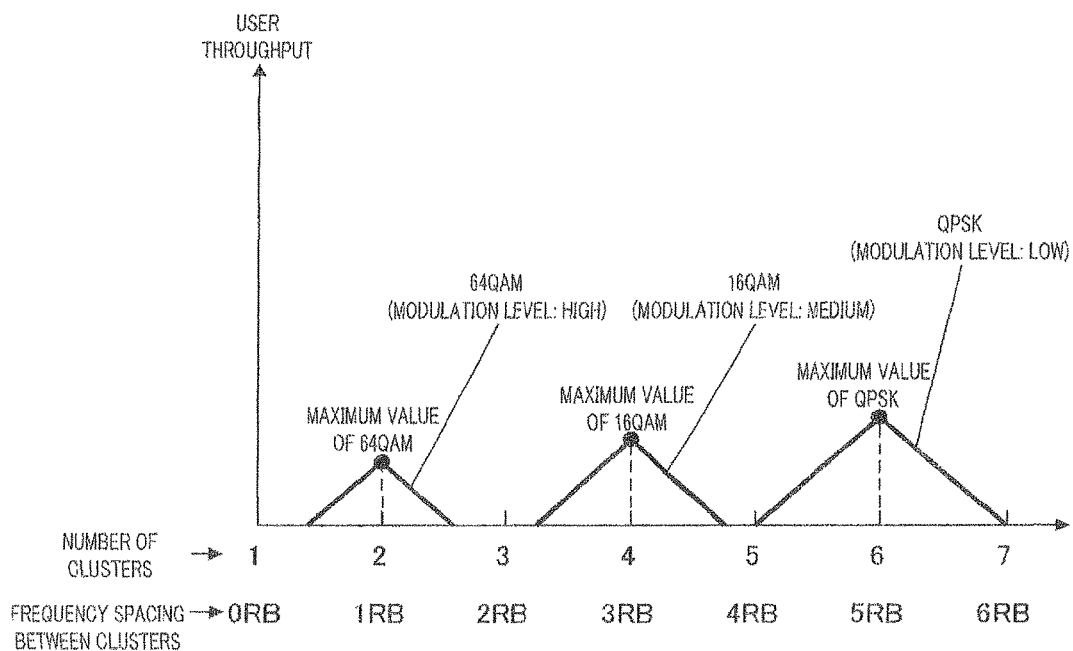
FIG. 3B is a diagram illustrating a relationship between the number of clusters (cluster spacing) and user throughput according to Embodiment 1 of the present invention (when SNR is low)

A cluster pattern that maximizes user throughput differs from one transmission parameter to another. As an example of transmission parameter, a case will be described using FIG. 3A and FIG. 3B where the modulation level (QPSK, 16 QAM, 64 QAM) is used. FIG. 3A (when SNR (Signal-to-Noise power Ratio) is high) and FIG. 3B (when SNR (Signal-to-Noise power Ratio) is low) illustrate a relationship between a cluster pattern of a C-SC-FDMA signal (here, the number of clusters or cluster spacing) and user throughput. As shown in FIG. 3A and FIG. 3B, the cluster pattern that maximizes user throughput (here, the number of clusters or cluster spacing) differs from one modulation level to another. Here, that the cluster pattern that maximizes user throughput differs from one modulation level to another may be attributable to the difference in robustness against ISI among different modulation levels (allowable ISI). That is, base station 100 and terminal 200 can improve the user throughput by setting an arrangement of the C-SC-FDMA signal (a plurality of clusters) in the frequency domain based on a cluster pattern with allowable ISI among different transmission parameters taken into consideration. A case has been described in FIG. 3A and FIG. 3B where the modulation level is taken as an example, but the same applies to other transmission parameters (coding size and coding rate).

Thus, scheduler 112 of base station 100 determines a cluster pattern of the C-SC-FDMA signal according to the transmission parameter (MCS set or coding size) set in the C-SC-FDMA signal from terminal 200. Furthermore, setting section 211 of terminal 200 sets the arrangement of the C-SC-FDMA signal (a plurality of clusters) in the frequency domain according to the cluster pattern corresponding to the transmission parameter (MCS set or coding size) set in the C-SC-FDMA signal transmitted by the terminal. Hereinafter, methods of setting a cluster arrangement 1-1 to 1-6 will be described.

<Setting Method 1-1>

According to the present setting method, setting section 211 divides an SC-FDMA signal by the number of clusters (the number of divisions) corresponding to the modulation level (modulation scheme) indicated in an MCS set that is set in the C-SC-FDMA signal.

As the modulation level increases, the Euclidean distance between signal points becomes shorter and susceptibility to the influence of ISI increases. That is, the higher the modulation level, the lower is the robustness against ISI (allowable ISI). Thus, setting section 211 preferably sets the arrangement of the C-SC-FDMA signal (a plurality of clusters) in the frequency domain so that ISI decreases as the modulation level set in the C-SC-FDMA signal transmitted by the terminal increases (as the robustness against ISI decreases).

Here, as the number of clusters of a C-SC-FDMA signal (the number of divisions of an SC-FDMA signal) increases, the number of discontinuous points in a fluctuation of the equalized channel gain at combining points of a plurality of clusters increases, and therefore ISI increases. Thus, ISI increases as the number of clusters of the C-SC-FDMA signal increases In other words, ISI decreases as the number of clusters of the C-SC-FDMA signal decreases.

Thus, according to the present setting method, setting section 211 divides a signal (SC-FDMA signal) in accordance with a cluster pattern with a smaller number of clusters (the number of clusters per certain unit bandwidth) for a higher modulation level indicated in the MCS set that is set in the signal transmitted by the terminal. That is, scheduler 112 determines a cluster pattern indicating a smaller number of clusters as the modulation level indicated in the MCS set that is set in the signal transmitted by terminal 200 increases.

Among SC-FDMA signals having the same bandwidth (certain unit bandwidth), the smaller (greater) the number of clusters obtained through division, the wider (narrower) is the bandwidth per cluster, that is, the cluster size per cluster. That is, among SC-FDMA signals having the same bandwidth, reducing (increasing) the number of clusters obtained by dividing the SC-FDMA signal is equivalent to widening (narrowing) the cluster size per a plurality of clusters obtained by dividing the SC-FDMA signal. Thus, setting section 211 may also divide the signal (SC-FDMA signal) in accordance with a cluster pattern with a wider cluster size for a higher modulation level indicated in the MCS set that is set in the signal transmitted by the terminal. That is, scheduler 112 may determine a cluster pattern indicating a wider cluster size for a higher modulation level indicated in the MCS set that is set in the signal transmitted by terminal 200.

This will be described more specifically below. Here, as shown in FIG. 4, cases using, as a modulation scheme, QPSK (modulation level: low) where two bits are transmitted with one symbol, 16 QAM (modulation level: medium) where four bits are transmitted with one symbol, and 64 QAM (modulation level: high) where six bits are transmitted with one symbol will be described. Furthermore, the bandwidth of the C-SC-FDMA signal in FIG. 5A and FIG. 5B, that is, the total cluster size of clusters #0 to #3 shown in FIG. 5A is equal to the total cluster size of clusters #0 and #1 shown in FIG. 5B.

Scheduler 112 of base station 100 decreases the number of clusters (widens the cluster size) as the modulation level increases. To be more specific, as shown in FIG. 4, scheduler 112 increases the number of clusters (narrows the cluster size) for QPSK of a low modulation level. On the other hand, as shown in FIG. 4, scheduler 112 decreases the number of clusters (widens the cluster size) for 64 QAM of a high modulation level. That is, scheduler 112 determines a cluster pattern that matches the number of clusters (high, medium, low) or cluster size (narrow, medium, wide) in accordance with the modulation level (low, medium, high). Base station 100 then reports spectrum division information including the determined cluster pattern (the number of clusters or cluster size) and frequency resource information to terminal 200.

Division section 212 of setting section 211 of terminal 200 divides the SC-FDMA signal (spectrum) inputted from DFT section 210 into a plurality of clusters according to the cluster pattern determined by scheduler 112 (the number of clusters or cluster size). That is, division section 212 divides the SC-FDMA signal in accordance with a cluster pattern with a smaller number of clusters (or the wider cluster size) for a higher modulation level indicated in the MCS set that is set in a signal transmitted by the terminal. Mapping section 213 of setting section 211 then maps the plurality of clusters to discontinuous frequency resources based on frequency resource information.

Figure 5A:
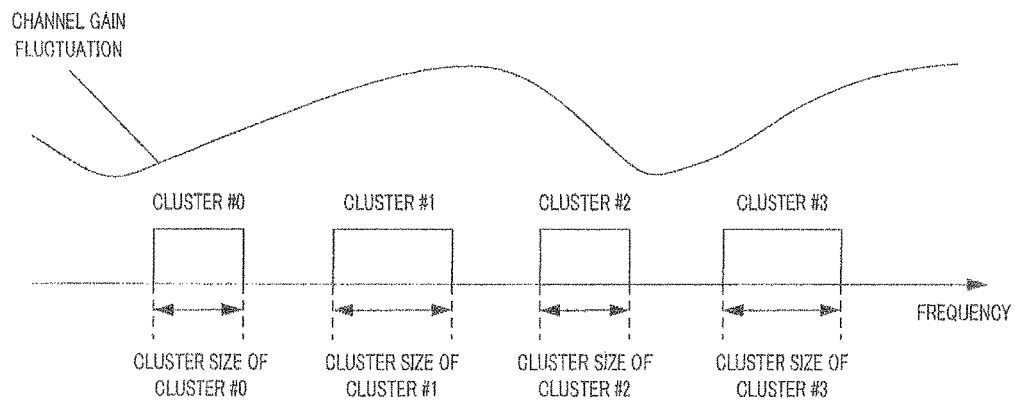
FIG. 5A is a diagram illustrating a method of setting a cluster arrangement according to Embodiment 1 of the present invention (when modulation level is low)

When, for example, the modulation scheme is QPSK (modulation level: low), scheduler 112 determines a cluster pattern (the number of clusters or cluster size) so that the number of clusters increases as shown in FIG. 5A (four clusters #0 to #3 in FIG. 5A), that is, the cluster size per cluster becomes narrower. As shown in FIG. 5A, division section 212 divides the SC-FDMA signal (spectrum) into four clusters of clusters #0 to #3 and mapping section 213 maps four clusters #0 to #3 to discontinuous frequency resources. As shown in FIG. 5A, a C-SC-FDMA signal with a high number of clusters (narrow cluster size) is thus generated.

Figure 5B:
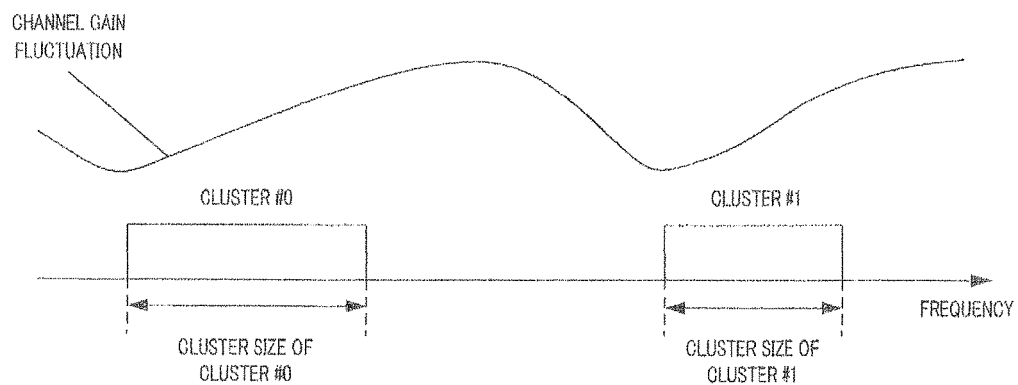
FIG. 5B is a diagram illustrating a method of setting a cluster arrangement according to Embodiment 1 of the present invention (when modulation level is high)

On the other hand, when the modulation scheme is 64 QAM (modulation level: high), scheduler 112 determines a cluster pattern (the number of clusters or cluster size) as shown in FIG. 5B so that the number of clusters decreases (two clusters #0 and #1 in FIG. 5B), that is, the cluster size becomes wider. As shown in FIG. 5B, division section 212 divides the SC-FDMA signal (spectrum) into two clusters of cluster #0 and cluster #1 and mapping section 213 maps cluster #0 and cluster #1 to discontinuous frequency resources. Thus, as shown in FIG. 5B, a C-SC-FDMA signal with a low number of clusters (wide cluster size) is generated.

Figure 6A:
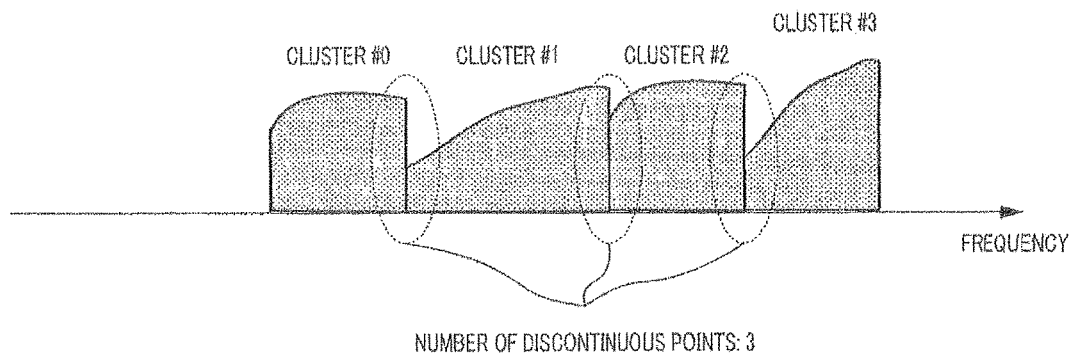
FIG. 6A is a diagram illustrating a combined signal according to Embodiment 1 of the present invention (when modulation level is low)

Terminal 200 then transmits the C-SC-FDMA signal shown in FIG. 5A (modulation scheme: QPSK) or FIG. 5B (modulation scheme: 64 QAM) to base station 100 and base station 100 applies equalization processing to the received C-SC-FDMA signal and combines the C-SC-FDMA signal (a plurality of clusters) after the equalization processing. This allows base station 100 to obtain a signal after the cluster combination as shown in FIG. 6A (modulation scheme: QPSK) or FIG. 6B (modulation scheme: 64 QAM).

Figure 6B:
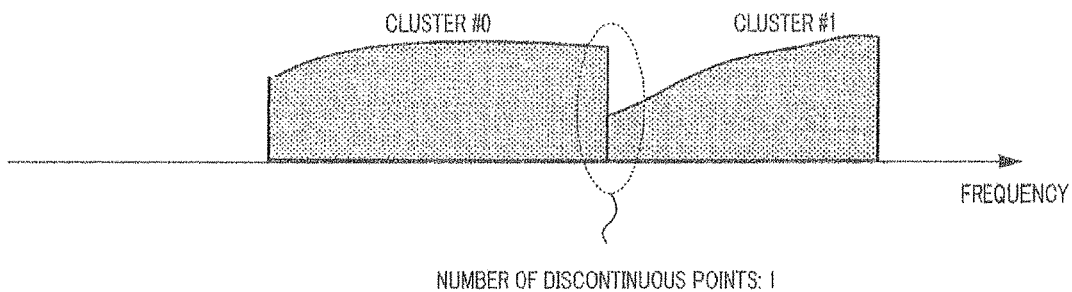
FIG. 6B is a diagram illustrating a combined signal according to Embodiment 1 of the present invention (when modulation level is high)

As shown in FIG. 6A, when the modulation level is low (modulation scheme: QPSK), the number of discontinuous points in a fluctuation of the equalized channel gain in the combined signal is 3. On the other hand, as shown in FIG. 6B, when the modulation level is high (modulation scheme: 64 QAM), the number of discontinuous points in a fluctuation of the equalized channel gain in the combined signal is 1. That is, as shown in FIG. 6A and FIG. 6B, as the modulation level increases, the number of discontinuous points in a fluctuation of the equalized channel gain in the combined signal decreases. That is, the higher the modulation level, the less is ISI generated at combining points (discontinuous points) of a plurality of clusters.

Thus, when the modulation level is high, that is, when the Euclidean distance between signal points is short and robustness against ISI (allowable ISI) is low, the number of clusters of the C-SC-FDMA signal is reduced (or the cluster size is widened). This lessens ISI against the C-SC-FDMA signal.

On the other hand, when the modulation level is low, that is, when the Euclidean distance between signal points is long and robustness against ISI (allowable ISI) is great, the number of clusters of C-SC-FDMA signal is increased (the cluster size is narrowed). This causes more clusters to be mapped to a plurality of frequency resources having different channel fluctuations, and can thereby improve the frequency diversity effect. However, as shown in FIG. 6A, when the modulation level is lower, the number of discontinuous points in a fluctuation of the equalized channel gain in the combined signal increases (that is, ISI increases). However, since the robustness against ISI (allowable ISI) becomes greater as the modulation level decreases, the influence of ISI on transmission characteristics is less.

Thus, according to the present setting method, the terminal divides the SC-FDMA signal by the number of clusters (or cluster size) according to the modulation level indicated in the MCS set. Thus, for a higher modulation level (lower allowable ISI), the terminal reduces the number of clusters of the C-SC-FDMA signal (reduces the number of combining points (discontinuous points) of clusters), and can thereby reduce ISI. Furthermore, for a lower modulation level (greater allowable ISI), the terminal increases the number of clusters of the C-SC-FDMA signal, and can thereby improve the frequency diversity effect. Thus, the present setting method can improve transmission characteristics according to the modulation level, and can thereby improve user throughput for each terminal while maintaining the effect of improving system throughput by C-SC-FDMA (by clustering an SC-FDMA signal) no matter what the modulation level is.

Furthermore, the present setting method determines the number of clusters (cluster size) according to the modulation level, and can thereby control ISI. Thus, when, for example, adaptive modulation/channel coding (Adaptive Modulation and channel Coding: AMC) control is used, the base station determines the number of clusters (cluster size) according to the modulation level, controls ISI, and can thereby estimate instantaneous ISI beforehand. Thus, the base station is more likely to be able to select an accurate MCS set in accordance with instantaneous receiving quality (e.g. instantaneous SINR) with the influence of instantaneous ISI taken into account. Thus, the present setting method selects an accurate MCS set, and can thereby reduce the number of retransmissions due to transmission errors, and can thereby further improve user throughput.

<Setting Method 1-2>

Although a case has been described in setting method 1 whereby setting section 211 divides the SC-FDMA signal by the number of clusters corresponding to the modulation level indicated in the MCS set that is set in the C-SC-FDMA signal, according to the present setting method, setting section 211 maps a plurality of clusters to frequency resources at a cluster spacing corresponding to the modulation level set in the C-SC-FDMA signal.

The wider the cluster spacing of the C-SC-FDMA signal, the lower is the frequency correlation between channels through which each cluster propagates. Thus, when base station 100 applies equalization processing based on a minimum mean square error (MMSE) approach or the like whereby a reception spectrum received after propagating through a frequency selective channel is not completely reconstructed, a difference in equalized channel gain (power difference and amplitude difference, and phase difference when there is a channel estimation error) at combining points (discontinuous points) of a plurality of clusters making up a C-SC-FDMA signal increases and ISI therefore increases. That is, the wider the cluster spacing of the C-SC-FDMA signal, the greater is ISI. In other words, ISI becomes less as the cluster spacing of the C-SC-FDMA signal becomes narrower.

Thus, according to the present setting method, for a higher modulation level indicated in an MCS set that is set in a signal transmitted by the terminal, setting section 211 maps a signal (SC-FDMA signal) to a plurality of discontinuous frequency resources in accordance with a cluster pattern with a narrower cluster spacing. That is, scheduler 112 determines a cluster pattern indicating a narrower cluster spacing for a higher modulation level indicated in the MCS set that is set in the signal transmitted by terminal 200.

Hereinafter, this will be described more specifically. Here, suppose the number of clusters is 2 (cluster #0 and cluster #1 shown in FIG. 8A and FIG. 8B). Furthermore, as with setting method 1-1, a case will be described where QPSK (modulation level: low), 16 QAM (modulation level: medium) and 64 QAM (modulation level: high) as shown in FIG. 7 are used as the modulation scheme. Furthermore, as with setting method 1-1, the bandwidths of the respective C-SC-FDMA signals in FIG. 8A and FIG. 8B are the same.

Scheduler 112 of base station 100 narrows the cluster spacing for a higher modulation level. To be more specific, as shown in FIG. 7, scheduler 112 widens the cluster spacing for QPSK of a low modulation level. Furthermore, as shown in FIG. 7, scheduler 112 narrows the cluster spacing for 64 QAM of a high modulation level. That is, scheduler 112 determines a cluster pattern that matches the cluster spacing (wide, medium, narrow) according to the modulation level (low, medium, high). Base station 100 reports frequency resource information including spectrum division information (e.g. the number of clusters: 2) and the determined cluster pattern (cluster spacing) to terminal 200.

Division section 212 of setting section 211 of terminal 200 divides the SC-FDMA signal (spectrum) inputted from DFT section 210 into two clusters according to the spectrum division information (here, the number of clusters: 2). Furthermore, mapping section 213 of setting section 211 maps the two clusters to discontinuous frequency resources according to the cluster pattern (cluster spacing) determined by scheduler 112. That is, mapping section 213 maps the plurality of clusters to a plurality of discontinuous frequency resources in accordance with a cluster pattern with a narrower cluster spacing for a higher modulation level indicated in the MCS set that is set in the signal transmitted by the terminal.

Figure 8A:
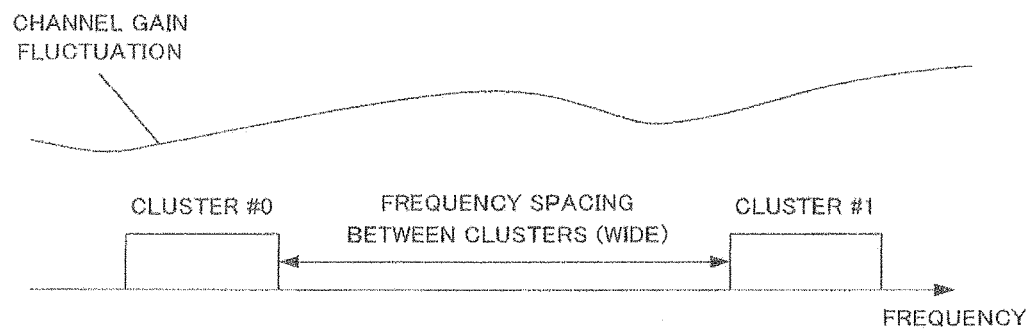
FIG. 8A is a diagram illustrating a method of setting a cluster arrangement according to Embodiment 1 of the present invention (when modulation level is low)
Figure 8B:
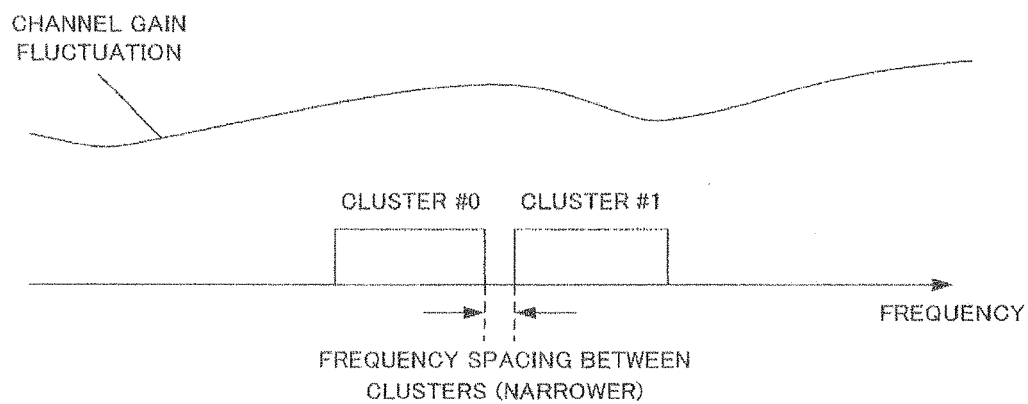
FIG. 8B is a diagram illustrating a method of setting a cluster arrangement according to Embodiment 1 of the present invention (when modulation level is high)

When, for example, the modulation scheme is QPSK (modulation level: low), scheduler 112 determines a cluster pattern (cluster spacing) so that the cluster spacing becomes wider as shown in FIG. 8A. Mapping section 213 then maps the two clusters of cluster #0 and cluster #1 generated by dividing the SC-FDMA signal (spectrum) by division section 212 as shown in FIG. 8A to discontinuous frequency resources separated apart by the frequency spacing shown in the cluster pattern. As shown in FIG. 8A, a C-SC-FDMA signal having a wide frequency spacing between cluster #0 and cluster #1 is generated.

On the other hand, when the modulation scheme is 64 QAM (modulation level: high), scheduler 112 determines a cluster pattern (cluster spacing) so that the cluster spacing becomes narrower as shown in FIG. 8B. As shown in FIG. 8B, mapping section 213 then maps two clusters of cluster #0 and cluster #1 generated by dividing the SC-FDMA signal (spectrum) by division section 212 to discontinuous frequency resources separated away by the frequency spacing shown in the cluster pattern. As shown in FIG. 8B, a C-SC-FDMA signal having a wide frequency spacing between cluster #0 and cluster #1 is thereby generated.

Figure 9A:
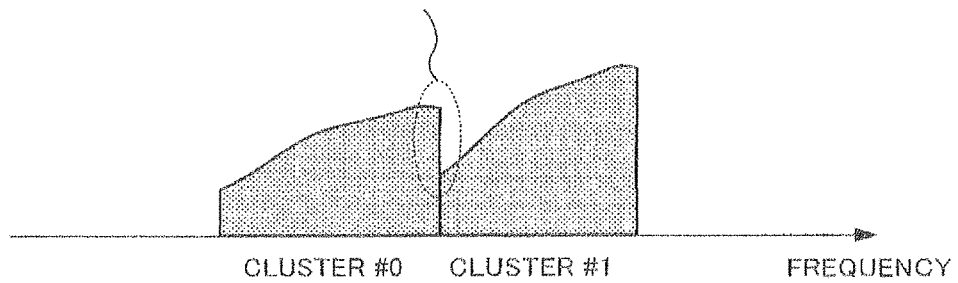
FIG. 9A is a diagram illustrating a combined signal according to Embodiment 1 of the present invention (when modulation level is low)

Terminal 200 then transmits the C-SC-FDMA signal shown in FIG. 8A (modulation scheme: QPSK) or FIG. 8B (modulation scheme: 64 QAM) to base station 100. Thus, base station 100 obtains a signal after the cluster combination as shown in FIG. 9A (modulation scheme: QPSK) or FIG. 9B (modulation scheme: 64 QAM).

Figure 9B:
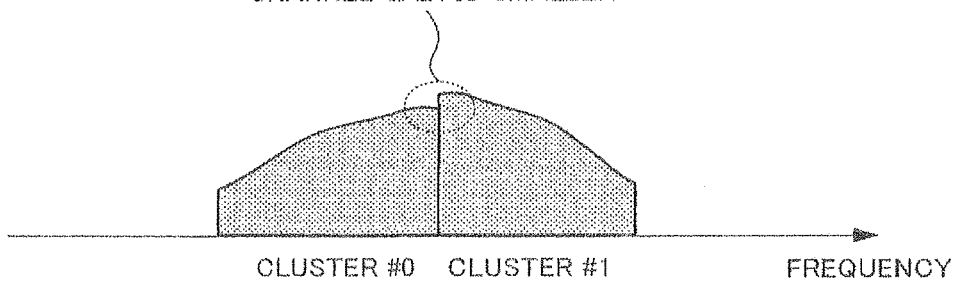
FIG. 9B is a diagram illustrating a combined signal according to Embodiment 1 of the present invention (when modulation level is high)

When the modulation level is low (modulation scheme: QPSK) as shown in FIG. 9A, the frequency spacing between cluster #0 and cluster #1 is wide and the frequency correlation between clusters is low. Thus, as shown in FIG. 8A, the difference in equalized channel gain is large at the combining point (discontinuous point) of the clusters. On the other hand, when the modulation level is high as shown in FIG. 8B (modulation scheme: 64 QAM), the frequency spacing between cluster #0 and cluster #1 is narrow and the frequency correlation between the clusters is high. Thus, as shown in FIG. 9B, the difference in equalized channel gain is small at the combining point (discontinuous point) of the clusters. That is, as shown in FIG. 9A and FIG. 9B, the higher the modulation level, the lower is the difference in equalized channel gain at the combining point (discontinuous point) of the clusters. Thus, the higher the modulation level, the less is ISI generated due to discontinuity at the combining points among a plurality of clusters.

Thus, when the modulation level is higher, that is, robustness against ISI (allowable ISI) is lower, the cluster spacing of the C-SC-FDMA signal is narrowed. As with setting method 1-1 (when the number of clusters is reduced), this makes it possible to reduce ISI with the C-SC-FDMA signal.

On the other hand, when the modulation level is lower, that is, robustness against ISI (allowable ISI) is greater, the cluster spacing of the C-SC-FDMA signal is widened. This makes it possible to improve the frequency diversity effect resulting from mapping a plurality of clusters to frequency resources separated further from each other. However, when the modulation level is lower, the spacing between clusters making up the C-SC-FDMA signal is widened, and therefore, as shown in, FIG. 9A, the difference in equalized channel gain at the combining point (discontinuous point) of the clusters becomes greater (that is, ISI increases). However, since the lower the modulation level, the greater is robustness against ISI (allowable ISI), the influence of ISI on transmission characteristics is less.

Thus, according to the present setting method, the terminal maps a plurality of clusters to frequency resources at a cluster spacing according to the modulation level indicated in the MCS set. Thus, by narrowing the cluster spacing of the C-SC-FDMA signal (by increasing the channel frequency correlation among a plurality of clusters) for a higher modulation level (lower allowable ISI), the terminal can reduce ISI. Furthermore, by widening the cluster spacing of the C-SC-FDMA signal for a low modulation level (greater allowable ISI), the terminal can improve the frequency diversity effect. Thus, according to the present setting method, as with setting method 1-1, it is possible to improve user throughput at each terminal while maintaining the effect of improving system throughput by C-SC-FDMA (that is, by clustering the SC-FDMA signal) no matter what the modulation level is.

Furthermore, the present setting method determines the cluster spacing according to the modulation level, and can thereby reduce ISI. Thus, as with setting method 1-1, when AMC control is used, the base station determines a cluster spacing according to the modulation level and controls ISI, and can thereby estimate instantaneous ISI beforehand. For this reason, the base station selects an accurate MCS set according to instantaneous receiving quality (e.g. instantaneous SINR) with the influence of instantaneous ISI taken into account, and can thereby reduce the number of retransmissions caused by transmission errors and further improve user throughput.

<Setting Method 1-3>

According to the present setting method, setting section 211 divides the SC-FDMA signal by the number of clusters (the number of divisions) according to a coding size (code block size) set in a C-SC-FDMA signal.

Since the greater the coding size, the higher is the coding gain (or error correcting capacity), robustness against ISI (allowable ISI) increases. In other words, since the smaller the coding size, the lower is the coding gain (or error correcting capacity), robustness against ISI (allowable ISI) becomes smaller.

Furthermore, assuming that the coding rate and modulation level with respect to a signal are fixed, the smaller the coding size, the narrower is the bandwidth allocated to the signal in the frequency domain, that is, the number of allocated RBs decreases.

Therefore, setting section 211 preferably sets an arrangement of a C-SC-FDMA signal (a plurality of clusters) in the frequency domain such that the smaller the coding size set in the C-SC-FDMA signal transmitted by the terminal (or the smaller the number of allocated RBs), the less is ISI.

Thus, according to the present setting method, setting section 211 divides the signal (SC-FDMA signal) in accordance with a cluster pattern with a smaller number of clusters (the number of clusters per certain unit bandwidth) for a smaller coding size (for a smaller number of allocated RBs) set in the signal transmitted by the terminal. That is, scheduler 112 determines a cluster pattern indicating a smaller number of clusters for a smaller coding size set in the signal transmitted by terminal 200. As in the case of allocation method 1-1, setting section 211 may also divide the signal (SC-FDMA signal) in accordance with a cluster pattern with a wider cluster size for a smaller coding size set in the signal transmitted by the terminal (or for a smaller number of allocated RBs).

Hereinafter, this will be described more specifically. Here, as shown in FIG. 10, a case will be described where a coding size (large, medium, small) (or the number of allocated RBs (high, medium, low)) is used. Furthermore, in FIG. 11A and FIG. 11B, suppose an MCS set (coding rate and modulation level) set in a C-SC-FDMA signal is fixed.

Scheduler 112 reduces the number of clusters (widens the cluster size) as the coding size decreases (as the number of allocated RBs becomes smaller). To be more specific, as shown in FIG. 10, scheduler 112 determines a cluster pattern that matches the number of clusters (high, medium, low) (or cluster size (narrow, medium, wide)) according to the coding size (large, medium, small) (or the number of allocated RBs (high, medium, low)). Base station 100 then reports spectrum division information including the determined cluster pattern (the number of clusters or cluster size) and frequency resource information to terminal 200.

Figure 11A:
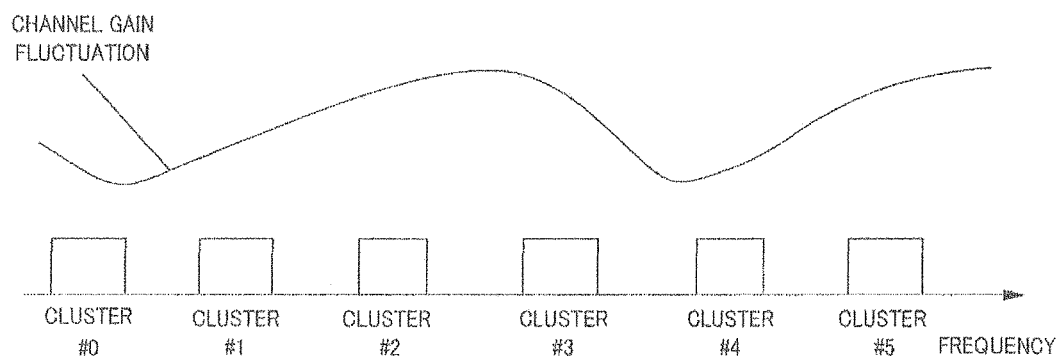
FIG. 11A is a diagram illustrating a method of setting a cluster arrangement according to Embodiment 1 of the present invention (when coding size is large)

When, for example, the coding size is large (the number of allocated RBs is high), scheduler 112 determines a cluster pattern (the number of clusters or cluster size) as shown in FIG. 11A such that the number of clusters increases (six clusters #0 to #5 in FIG. 11A), that is, the cluster size per cluster becomes narrower as with setting method 1-1 (FIG. 5A). On the other hand, when the coding size is small (when the number of allocated RBs is low), scheduler 112 determines the cluster pattern (the number of clusters or cluster size) such that the number of clusters decreases (two clusters #0 and #1 in FIG. 11B), that is, the cluster size becomes wider as shown in FIG. 11B as with setting method 1-1 (FIG. 5B).

Figure 11B:
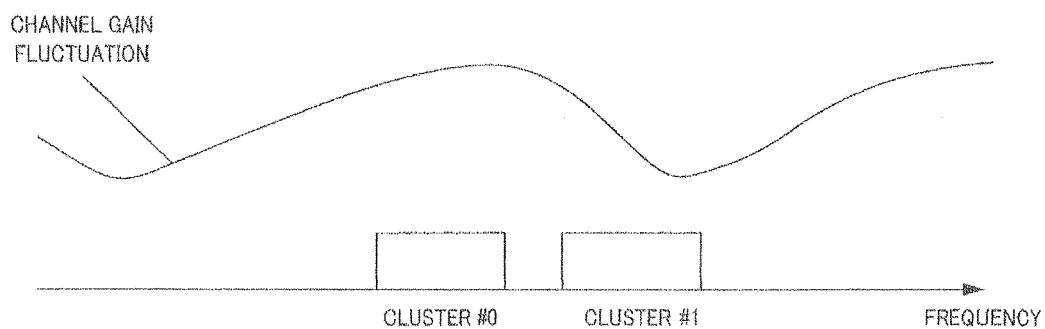
FIG. 11B is a diagram illustrating a method of setting a cluster arrangement according to Embodiment 1 of the present invention (when coding size is small)

Division section 212 of setting section 211 divides an SC-FDMA signal (spectrum) into a plurality of clusters based on the number of clusters (or cluster size) indicated in the cluster pattern shown in FIG. 11A or FIG. 11B. That is, division section 212 divides the signal in accordance with a cluster pattern with a smaller number of clusters (or wider cluster size) for a smaller coding size set in the signal transmitted by the terminal (for a smaller number of allocated RBs). Mapping section 213 maps the plurality of clusters to discontinuous frequency resources based on frequency resource information.

Thus, when the coding size is smaller (when the number of allocated RBs is smaller), that is, when robustness against ISI (allowable ISI) is lower, the number of clusters of the C-SC-FDMA signal is reduced (or the cluster size is widened) as with setting method 1-1. This reduces the number of discontinuous points of a fluctuation of the equalized channel gain in the combined signal in base station 100, and can thereby reduce ISI with the C-SC-FDMA signal.

Furthermore, when the coding size is larger (when the number of allocated RBs is higher), that is, when robustness against ISI (allowable ISI) is higher, the number of clusters of the C-SC-FDMA signal is increased (the cluster size is narrowed) as with setting method 1-1. This causes the number of discontinuous points of a fluctuation of the equalized channel gain to increase in the combined signal, but base station 100 performs error correcting decoding with a large coding size, and can thereby improve the frequency diversity effect and obtain a greater coding gain while suppressing the influence of allowable ISI.

Thus, according to the present setting method, even when the terminal divides the SC-FDMA signal by the number of clusters (the number of divisions) according to the coding size (or the number of allocated RBs), it is possible to improve user throughput at each terminal while maintaining the effect of improving system throughput by C-SC-FDMA (that is, by clustering the SC-FDMA signal) no matter what the coding size is as with setting method 1-1.

<Setting Method 1-4>

According to the present setting method, setting section 211 maps a plurality of clusters making up a C-SC-FDMA signal to frequency resources with a cluster spacing corresponding to a coding size (the number of allocated RBs) set in a C-SC-FDMA signal.

That is, according to the present setting method, setting section 211 maps a signal (SC-FDMA signal) to a plurality of discontinuous frequency resources in accordance with a cluster pattern with a narrower cluster spacing for a smaller coding size (for a smaller number of allocated RBs) set in a signal transmitted by the terminal. That is, scheduler 112 determines a cluster pattern indicating a narrower cluster spacing for a smaller coding size (or for a smaller number of allocated RBs) set in the signal transmitted by terminal 200.

Hereinafter, this will be described more specifically. Here, suppose the number of clusters is 2 (cluster #0 and cluster #1) as with setting method 1-2. Furthermore, as with setting method 1-3 (FIG. 10), a case will be described as shown in FIG. 12 where the coding size (large, medium, small) (or the number of allocated RBs (high, medium, low)) is used. Furthermore, in FIG. 13A and FIG. 13B, suppose the MCS set (coding rate and modulation level) set in a C-SC-FDMA signal is fixed.

Scheduler 112 narrows a cluster spacing for a smaller coding size (for a smaller number of allocated RBs). To be more specific, as shown in FIG. 12, scheduler 112 determines a cluster pattern that matches the cluster spacing (wide, medium, narrow) according to the coding size (large, medium, small) (or the number of allocated RBs (high, medium, low)). Base station 100 then reports frequency resource information including spectrum division information (e.g. the number of clusters: 2) and the determined cluster pattern (cluster spacing) to terminal 200.

Figure 13A:
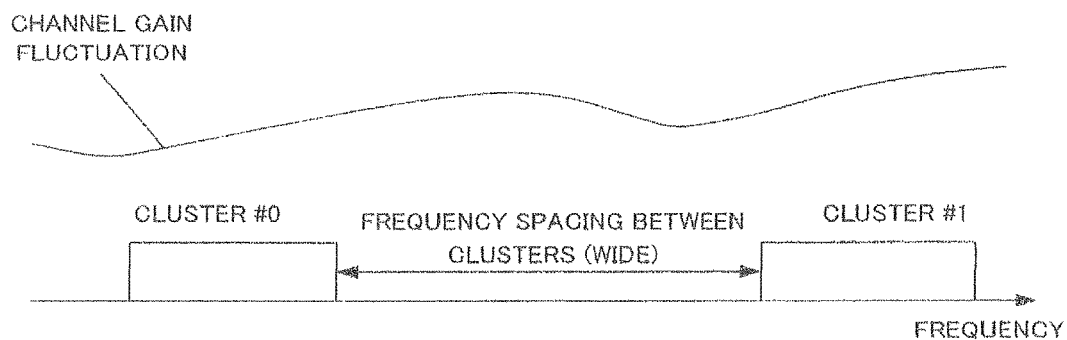
FIG. 13A is a diagram illustrating a method of setting a cluster arrangement according to Embodiment 1 of the present invention (when coding size is large)

When, for example, the coding size is large (the number of allocated RBs is high), scheduler 112 determines a cluster pattern (cluster spacing) such that the cluster spacing becomes wider as shown in FIG. 13A as with setting method 1-2 (FIG. 8A). On the other hand, when the coding size is small (when the number of allocated RBs is small), scheduler 112 determines a cluster pattern (cluster spacing) such that the cluster spacing becomes narrower as shown in FIG. 13B as with setting method 1-2 (FIG. 8B).

Figure 13B:
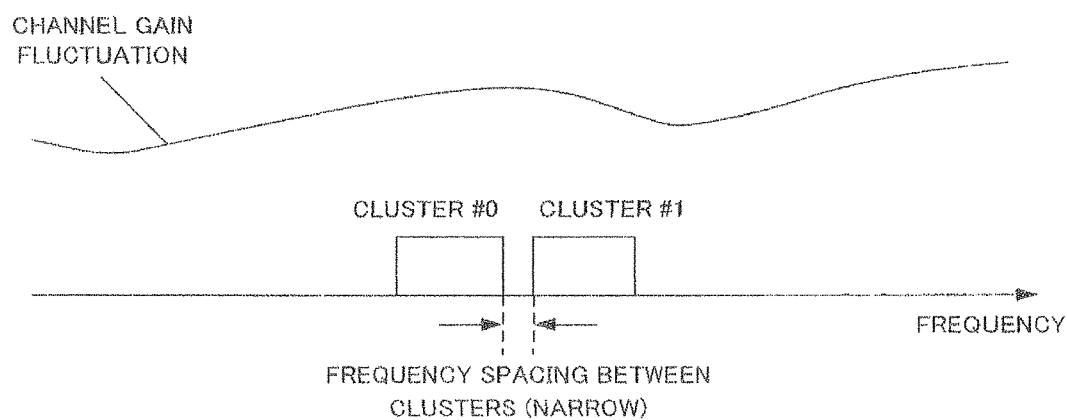
FIG. 13B is a diagram illustrating a method of setting a cluster arrangement according to Embodiment 1 of the present invention (when coding size is small)

Division section 212 of setting section 211 then divides an SC-FDMA signal (spectrum) into two clusters of cluster #0 and cluster #1 as shown in FIG. 13A or FIG. 13B based on spectrum division information (here, the number of clusters: 2). Furthermore, mapping section 213 of setting section 211 maps the two clusters of cluster #0 and cluster #1 to discontinuous frequency resources based on a cluster spacing indicated in the cluster pattern as shown in FIG. 13A or FIG. 13B. That is, mapping section 213 maps the plurality of clusters to a plurality of discontinuous frequency resources in accordance with a cluster pattern with a narrower cluster spacing for a smaller coding size (a smaller number of allocated RBs) set in a signal transmitted by the terminal.

Thus, when the coding size is smaller (the number of allocated RBs is smaller), that is, when robustness against ISI (allowable ISI) is lower, the cluster spacing of the C-SC-FDMA signal is narrowed as with setting method 1-2. Thus, the frequency correlation between clusters (here, between cluster #0 and cluster #1) becomes higher. Since a fluctuation of the equalized channel gain at combining points (discontinuous points) of clusters become moderate (that is, the difference in equalized channel gain becomes smaller), ISI with the C-SC-FDMA signal can be reduced.

Furthermore, when the coding size is larger (the number of allocated RBs is higher), that is, robustness against ISI (allowable ISI) is higher, the spacing of clusters making up a C-SC-FDMA signal is widened as with setting method 1-2. Although this causes the frequency correlation between clusters (here, between cluster #0 and cluster #1) to become lower (fluctuation of the equalized channel gain at combining points (discontinuous points) of clusters becomes drastic), by performing error correcting decoding with a large coding size, it is possible to improve the frequency diversity effect and thereby obtain a large coding gain while suppressing the influence of allowable ISI.

Thus, according to the present setting method, even when the terminal maps a plurality of clusters to frequency resources with a cluster spacing that matches the coding size (or the number of allocated RBs), it is possible to improve user throughput for each terminal while maintaining the effect of improving system throughput by C-SC-FDMA (by clustering an SC-FDMA signal) no matter what the coding size is as with setting method 1-2.

<Setting Method 1-5>

According to the present setting method, setting section 211 divides an SC-FDMA signal by the number of clusters (the number of divisions) according to a coding rate indicated in an MCS set that is set in a C-SC-FDMA signal.

With data of the same coding size, longer encoded data is generated as the coding rate decreases. That is, the lower the coding rate, the higher is the coding gain (or error correcting capacity), and robustness against ISI (allowable ISI) thereby increases. In other words, since the higher the coding rate, the lower is the coding gain (or error correcting capacity), and robustness against ISI (allowable ISI) thereby decreases.

Thus, according to the present setting method, setting section 211 divides a signal (SC-FDMA signal) in accordance with a cluster pattern with a smaller number of clusters (the number of clusters per certain unit bandwidth) for a higher coding rate indicated in an MCS set that is set in the signal transmitted by the terminal. That is, scheduler 112 determines a cluster pattern indicating a smaller number of clusters for a higher coding rate indicated in the MCS set that is set in the signal transmitted by terminal 200. Setting section 211 may also divide a signal (SC-FDMA signal) in accordance with a cluster pattern with a wider cluster size for a higher coding rate indicated in the MCS set that is set in the signal transmitted by the terminal as with allocation method 1.

Hereinafter, this will be described more specifically. Here, as shown in FIG. 14, a case will be described where the coding rate (low, medium, high) is used. Furthermore, suppose the coding size and modulation level (modulation scheme) are fixed here.

Scheduler 112 reduces the number of clusters (widens the cluster size) for a higher coding rate. To be more specific, as shown in FIG. 14, scheduler 112 determines a cluster pattern that matches the number of clusters (high, medium, low) (or cluster size (narrow, medium, wide)) according to the coding rate (low, medium, high). Base station 100 then reports spectrum division information and frequency resource information including the determined cluster pattern (the number of clusters or cluster size) to terminal 200.

When, for example, the coding rate is low, scheduler 112 determines a cluster pattern (the number of clusters or cluster size) such that the number of clusters increases, that is, the cluster size per cluster becomes narrower as with setting method 1-3 (FIG. 11A). On the other hand, when the coding rate is high, scheduler 112 determines a cluster pattern (the number of clusters or cluster size) such that the number of clusters decreases, that is, the cluster size becomes wider as with setting method 1-3 (FIG. 11B).

Division section 212 of setting section 211 divides an SC-FDMA signal (spectrum) into a plurality of clusters based on the number of clusters (or cluster size) indicated in the cluster pattern. That is, division section 212 divides the signal in accordance with a cluster pattern with a smaller number of clusters (or a wider cluster size) for a higher coding rate indicated in the MCS set that is set in the signal transmitted by the terminal. Mapping section 213 of setting section 211 then maps a plurality of clusters to discontinuous frequency resources based on frequency resource information.

Thus, by reducing the number of clusters of the C-SC-FDMA signal (or widening the cluster size) for a higher coding rate, that is, smaller robustness against ISI (allowable ISI), it is possible to reduce ISI with the C-SC-FDMA signal as with setting method 1-1.

Furthermore, by increasing the number of clusters of the C-SC-FDMA signal (narrowing the cluster size) for a lower coding rate, that is, high robustness against ISI (allowable ISI) and by performing error correcting decoding with a low coding rate as with setting method 1-1, it is possible to improve the frequency diversity effect while suppressing the influence of allowable ISI.

Thus, according to the present setting method, even when the terminal divides the SC-FDMA signal by the number of clusters (the number of divisions) that matches the coding rate, it is possible to improve user throughput for each terminal while maintaining the effect of improving system throughput by C-SC-FDMA (by clustering an SC-FDMA signal) no matter what the coding rate is as with setting method 1-1.

Furthermore, the present setting method determines the number of clusters (size) according to the coding rate, and can thereby control ISI. Thus, when AMC control is used as with setting method 1-1, the base station determines the number of clusters (size) according to the coding rate and controls ISI, and can thereby estimate instantaneous ISI beforehand. For this reason, the base station selects an accurate MCS set corresponding to instantaneous receiving quality (e.g. instantaneous SINR) with the influence of instantaneous ISI taken into account, and can thereby reduce the number of retransmissions caused by transmission errors and further improve user throughput.

<Setting Method 1-6>

According to the present setting method, setting section 211 maps a plurality of clusters making up a C-SC-FDMA signal to frequency resources with a cluster spacing that matches a coding rate indicated in an MCS set that is set in the C-SC-FDMA signal.

That is, according to the present setting method, setting section 211 maps the signal (SC-FDMA signal) to a plurality of discontinuous frequency resources in accordance with a cluster pattern with a narrower cluster spacing for a higher coding rate indicated in an MCS set that is set in the signal transmitted by the terminal. That is, scheduler 112 determines a cluster pattern indicating a narrower cluster spacing for a higher coding rate indicated in the MCS set that is set in the signal transmitted by terminal 200.

Hereinafter, this will be described more specifically. Here, suppose the number of clusters is 2 as with setting method 1-2. Furthermore, as with setting method 1-5 (FIG. 14), a case will be described as shown in FIG. 15 where the coding rate (low, medium, high) is used. Furthermore, suppose the coding size and modulation level are fixed here.

Scheduler 112 narrows the cluster spacing for a higher coding rate. To be more specific, as shown in FIG. 15, scheduler 112 determines a cluster pattern with a cluster spacing (wide, medium, narrow) that matches the coding rate (low, medium, high). Base station 100 then reports spectrum division information (e.g. the number of clusters: 2) and frequency resource information including the determined cluster pattern (cluster spacing) to terminal 200.

When, for example, the coding rate is low, scheduler 112 determines a cluster pattern (cluster spacing) such that the cluster spacing becomes wider as with setting method 1-4 (FIG. 13A). On the other hand, when the coding rate is high, scheduler 112 determines a cluster pattern (cluster spacing) so that the cluster spacing becomes narrower as with setting method 1-4 (FIG. 13B).

Division section 212 of setting section 211 divides the SC-FDMA signal (spectrum) into a plurality of clusters based on spectrum division information. Furthermore, mapping section 213 of setting section 211 maps the plurality of clusters to discontinuous frequency resources based on a cluster spacing indicated in the cluster pattern. That is, mapping section 213 maps the plurality of clusters to a plurality of discontinuous frequency resources in accordance with a cluster pattern with a narrower cluster spacing for a higher coding rate set in the signal transmitted by the terminal.

Thus, the cluster spacing of the C-SC-FDMA signal is narrowed for a higher coding rate, that is, smaller robustness against ISI (allowable ISI), and it is thereby possible to reduce ISI with the C-SC-FDMA signal as with setting method 1-2.

Furthermore, by widening the spacing of clusters making up the C-SC-FDMA signal for a lower coding rate, that is, greater robustness against ISI (allowable ISI) and performing error correcting decoding at a lower coding rate as with setting method 1-2, it is possible to improve the frequency diversity effect while suppressing the influence of allowable ISI.

Thus, according to the present setting method, even when the terminal maps a plurality of clusters to frequency resources at a cluster spacing that matches the coding rate, it is possible to improve user throughput for each terminal while maintaining the effect of improving system throughput by C-SC-FDMA (by clustering an SC-FDMA signal) no matter what the coding rate is as with setting method 1-2.

Furthermore, the present setting method determines a cluster spacing according to the coding rate, and can thereby control ISI. Thus, as with setting method 1-2, when AMC control is used, the base station determines a cluster spacing according to the coding rate, controls ISI, and can thereby estimate instantaneous ISI beforehand. Thus, the base station selects an accurate MCS set corresponding to instantaneous receiving quality (e.g. instantaneous SINR) with the influence of instantaneous ISI taken into account, and can thereby reduce the number of retransmissions caused by transmission errors and further improve user throughput.

Methods of setting a cluster arrangement 1-1 to 1-6 have been described so far.

Thus, according to the present embodiment, the terminal divides the SC-FDMA signal (spectrum) into a plurality of clusters in accordance with a cluster pattern that matches the MCS set (modulation level, coding rate) or coding size and maps the plurality of clusters to discontinuous frequency resources. This allows the terminal to set an arrangement of the plurality of clusters in the frequency domain according to the difference in robustness against ISI (allowable ISI) per transmission parameter. Thus, according to the present embodiment, when dividing the SC-FDMA signal into a plurality of clusters and mapping the plurality of clusters to discontinuous frequency bands, that is, even when using C-SC-FDMA, it is possible to improve transmission characteristics for different terminals in which different transmission parameters are set and improve user throughput while maintaining the effect of improving system throughput.

In the present embodiment, base station 100 may set a threshold to determine a cluster pattern. Thus, base station 100 compares a transmission parameter (modulation level, coding rate or coding size) set in each terminal with the threshold, and can thereby determine a cluster pattern. Furthermore, each terminal can easily perform division processing on an SC-FDMA signal (spectrum) and mapping processing on a C-SC-FDMA signal (a plurality of clusters). Hereinafter, an example where base station 100 sets a threshold and determines a cluster pattern will be described using FIG. 16 to FIG. 19. In FIG. 16 to FIG. 19, $B_i$ (i=0, 1, . . . ) is a bandwidth (cluster size) per cluster and shows, for example, a minimum bandwidth (minimum cluster size) defined per transmission parameter in a range separated by a threshold and holds the relationship $B_i \le B_{i+1}$. Furthermore, B'$_i$ (i=0, 1, . . . ) shows a maximum cluster spacing defined per transmission parameter in a range separated by a threshold and holds the relationship B'$_i$≥B'$_{i+1}$.

For example, base station 100 may set a threshold in the modulation level and thereby determine a cluster pattern. For example, as shown in FIG. 16A, base station 100 may set a threshold so as to separate between a plurality of modulation levels by a certain range of modulation level, compare modulation level (A) set in each terminal with the threshold and determine the number of clusters (X). To be more specific, in FIG. 16A, base station 100 determines the number of clusters X to be 4 when modulation level (A) is BPSK to QPSK, determines the number of clusters X to be 3 when modulation level (A) is 8 PSK to 16 QAM, determines the number of clusters X to be 2 when modulation level (A) is 32QAM to 64 QAM and determines the number of clusters X to be 1 when modulation level (A) is 128QAM to 256QAM. That is, in FIG. 16A, a fixed number of clusters is determined for a certain range of modulation level.

Furthermore, as shown in method 1 in FIG. 16B, base station 100 may also set a threshold per modulation level and set an upper limit of the number of clusters X per modulation level. For example, as shown in method 1 in FIG. 16B, base station 100 determines the number of clusters whose upper limit is the number of clusters X=4 when modulation level (A) is BPSK and determines the number of clusters whose upper limit is the number of clusters X=2 when modulation level (A) is 16 QAM. The same applies to QPSK and 64 QAM as well. This allows setting section 211 of each terminal to set the number of clusters so as to prevent ISI greater than allowable ISI per modulation level from occurring. Furthermore, as shown in method 2 in FIG. 16B, base station 100 may also set a lower limit and upper limit to the number of clusters X per modulation level. For example, as shown in method 2 in FIG. 16B, base station 100 determines the number of clusters within a range of 2≤X≤4 when modulation level (A) is BPSK and determines the number of clusters within a range of 1≤X≤2 when modulation level (A) is 16 QAM. This allows setting section 211 of each terminal to only set the number of clusters X corresponding to user throughput of a certain value or greater including a maximum value as shown in FIG. 3A or FIG. 3B. Furthermore, base station 100 limits the range of the number of clusters X per modulation level, and can thereby reduce the number of reporting bits to report the number of clusters X.

Furthermore, as shown in FIG. 16C, base station 100 may set a threshold so as to separate between a plurality of modulation levels for every certain range of modulation level and set cluster size (Y) for every range of modulation level. According to method 1 in FIG. 16C, as with method 1 in FIG. 16B, base station 100 determines one cluster size Y whose lower limit corresponds to a minimum cluster size (B$_0$, B$_1$, B$_2$, B$_3$ shown in method 1 in FIG. 16C) defined for every range of modulation level. As shown in method 1 in FIG. 16C, for BPSK to QPSK which is a range having a minimum modulation level (that is, when allowable ISI is maximum), base station 100 may determine an arbitrary value for cluster size Y. Furthermore, according to method 2 in FIG. 16C as with method 2 in FIG. 16B, an upper limit and a lower limit of cluster size Y are set for every range of modulation level.

Furthermore, when base station 100 calculates cluster size (Y) using the number of clusters (X), as shown in FIG. 16D, base station 100 may set a threshold per modulation level, set the number of clusters X$_a$ per modulation level and calculate cluster size Y. Here, X$_a$ (a=0, 1, 2, . . . , a is a number assigned for every range of modulation level separated by a threshold) represents the number of clusters set for every range (a) of modulation level. Furthermore, B represents a total bandwidth used for a C-SC-FDMA signal (that is, the sum of respective cluster sizes). To be more specific, in FIG. 16D, base station 100 uses the number of clusters X$_a$ set per modulation level (a=0, 1, 2, . . . ) to calculate cluster size Y=B/X$_a$ set in the modulation level.

Furthermore, as shown in FIG. 16E, base station 100 may also set a threshold so as to separate between a plurality of modulation levels for every certain range of modulation level and set cluster spacing (Z) for every range of modulation level. In FIG. 16E, base station 100 determines cluster spacing Z whose upper limit is a maximum cluster spacing (B'$_0$, B'$_1$, B'$_2$, B'$_3$ shown in FIG. 16E) for every range of modulation level. As shown in FIG. 16E, for BPSK to QPSK which is a range having a minimum modulation level, base station 100 may set an arbitrary value for cluster spacing Z.

Furthermore, as with FIG. 16A to FIG. 16E, base station 100 may set a threshold for a coding size and determine a cluster pattern. For example, as shown in FIG. 17A, base station 100 may set a threshold so as to separate between coding sizes for every certain range of coding size, compare coding size (N) set in each terminal with the threshold and determine the number of clusters (X). To be more specific, in FIG. 17A, base station 100 determines the number of clusters X to be 1 when coding size N is 100 bits or less and determines the number of clusters X to be 2 when coding size N is 101 bits or more and 500 bits or less. The same applies to a case where coding size N is 501 bits or more and 1000 bits or less and a case where coding size N is 1001 bits or more.

Furthermore, as shown in FIG. 17B, base station 100 may set cluster size (Y) for every range of coding size. According to method 1 in FIG. 17B, as with method 1 in FIG. 16C, base station 100 determines one cluster size Y whose lower limit corresponds to a minimum cluster size (B$_0$, B$_1$, B$_2$, B$_3$ shown in method 1 in FIG. 17B) defined for every range of coding size. According to method 1 in FIG. 17B, when coding size N is 1001 bits or more, base station 100 may determine an arbitrary value for cluster size Y. Furthermore, as shown in method 2 in FIG. 17B, base station 100 may set a lower limit and upper limit of cluster size Y for every range of coding size as with method 2 in FIG. 16C.

Furthermore, when base station 100 calculates cluster size (Y) using the number of clusters (X), as with FIG. 16D, base station 100 may set the number of clusters X$_n$ for every range of coding size as shown in FIG. 17C and calculate cluster size Y. Here, X$_n$ (n=0, 1, 2, . . . , n is a number assigned for every range of coding size separated by a threshold) represents the number of clusters set for every range (n) of coding size. To be more specific, in FIG. 17C, as with FIG. 16D, using the number of clusters X$_n$ set for every range of coding size (n=0, 1, 2, . . . ), cluster size Y=B/X$_n$ set for the coding size is calculated. As shown in FIG. 17C, in a range in which coding size N is 1001 bits or more, base station 100 may determine an arbitrary value for cluster size Y.

Furthermore, as shown in FIG. 17D, base station 100 may set cluster spacing (Z) for every range of coding size. In FIG. 17D, as with FIG. 16E, base station 100 determines a cluster spacing whose upper limit corresponds to a maximum cluster spacing (B'$_0$, B'$_1$, B'$_2$, B'$_3$ shown in FIG. 17D) for every range of coding size. As shown in FIG. 17D, for a range in which coding size (N) is 1001 bits or more, base station 100 may set an arbitrary value for cluster spacing (Z).

Furthermore, as with FIG. 16A to FIG. 16E, base station 100 may set a threshold for a coding rate and determine a cluster pattern. For example, as shown in FIG. 18A, base station 100 sets a threshold so as to separate between coding rates for every certain range of coding rate, compare coding rate (R) set in each terminal with the threshold and determine the number of clusters (X). To be more specific, in FIG. 18A, base station 100 determines the number of clusters X to be 4 when coding rate R is 1/3 or below and determines the number of clusters X to be 3 when coding rate R is greater than 1/3 and 1/2 or below. The same will apply to a case where coding rate R is greater than 1/2 and 2/3 or below and a case where coding rate R is greater than 2/3.

Furthermore, as shown in FIG. 18B, base station 100 may set cluster size (Y) for every range of coding rate. According to method 1 in FIG. 18B as with method 1 in FIG. 16C, base station 100 determines one cluster size Y whose lower limit corresponds to a minimum cluster size ($B_0$, $B_1$, $B_2$, $B_3$ shown in method 1 in FIG. 18B) defined for every range of coding rate. In FIG. 18B, when coding rate R is 1/3 or below, base station 100 may set an arbitrary value for cluster size Y. Furthermore, according to method 2 in FIG. 18B, as with method 2 in FIG. 16C, an upper limit and a lower limit of cluster size Y are set for every range of coding rate.

When base station 100 calculates cluster size (Y) using the number of clusters (X), as shown in FIG. 18C, as with FIG. 16D, base station 100 may set the number of clusters $X_r$ for every range of coding rate and calculate cluster size (Y). Here, $X_r$ (r=0, 1, 2, . . . , r is a number assigned to each range of coding rate separated by a threshold) represents the number of clusters set for every range (r) of coding rate. To be more specific, in FIG. 18C as with FIG. 16D, cluster size Y=B/$X_r$ set in the coding rate is calculated using the number of clusters $X_r$ set for every range of coding rate (r=0, 1, 2, . . . ). As shown in FIG. 18C, for a range where coding rate R is 100 bits or less, base station 100 may set an arbitrary value for cluster size Y.

Furthermore, as shown in FIG. 18D, base station 100 may also set cluster spacing (Z) for every range of coding rate. In FIG. 18D, as with FIG. 16E, base station 100 determines cluster spacing (Z) whose upper limit is a maximum cluster spacing ($B'_0$, $B'_1$, $B'_2$, $B'_3$ shown in FIG. 18D) for every range of coding rate. As shown in FIG. 18D, in a range where coding rate (R) is 1/3 or below, base station 100 may set an arbitrary value for cluster spacing (Z).

Furthermore, a case has been described in the present embodiment where base station 100 determines a cluster pattern (the number of clusters, cluster size or cluster spacing) according to the modulation level, coding rate or coding size. However, in the present invention, base station 100 may also determine a cluster pattern by combining a plurality of transmission parameters (modulation level, coding rate and coding size). For example, base station 100 may also determine a cluster pattern by combining the modulation level and coding rate, that is, according to an MCS set. When, for example, AMC control is used whereby the modulation level and coding rate are simultaneously controlled, base station 100 can simultaneously control robustness against ISI caused by both the modulation level and coding rate. For example, as shown in FIG. 19A, base station 100 may determine the number of clusters (X) for each MCS set expressed by the modulation level and coding rate, determine cluster size (Y) for each MCS set as shown in FIG. 19B or determine cluster spacing (Z) for each MCS set as shown in FIG. 19C.

Furthermore, although a case has been described in FIG. 16 to FIG. 19 where a cluster pattern is determined without taking the SINR (or average SNR) into account, the present invention may change the associations in FIG. 16 to FIG. 19 according to a fluctuation of the SINR (or average SNR).

Figure 20:
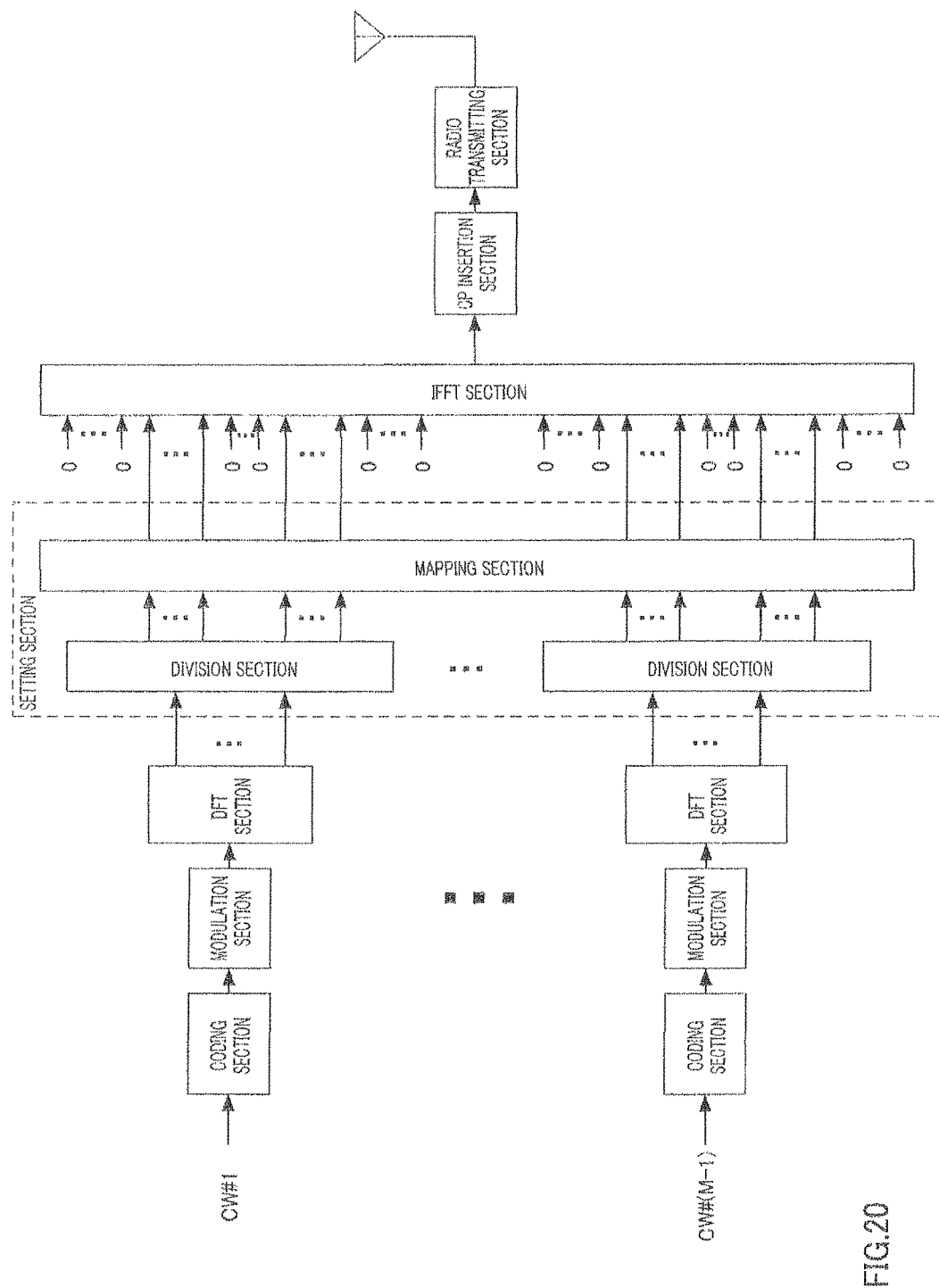
FIG. 20 is a block configuration diagram of a terminal according to a variation of Embodiment 1 of the present invention.

Furthermore, in the present embodiment when terminal 200 multiplexes a plurality of codewords (coding unit, codeword: CW) in the frequency domain as shown in FIG. 20 and transmits the codewords to base station 100, base station 100 may determine a cluster pattern for each CW transmitted from terminal 200. Here, when CW #1 to CW #(M−1) are multiplexed in the frequency domain and transmitted as shown in FIG. 20, terminal 200 divides the CW into a plurality of clusters through the division section provided for each CW and frequency-multiplexes clusters per CW through the mapping section.

Furthermore, when different transmission rates are used among a plurality of CWs, terminal 200 may decrease the number of clusters (widen the cluster size) or narrow the cluster spacing for a CW having a higher transmission rate and thereby set an arrangement of a plurality of clusters making up the CW in the frequency domain. For a higher transmission rate, robustness against ISI needs to be increased. Thus, it is possible to reduce ISI by increasing the number of clusters (widening the cluster size) for CWs with high transmission rates or narrowing the cluster spacing, and increase robustness against ISI in consequence. This makes it possible to further improve transmission characteristics for each CW according to the transmission rate and further improve transmission rates of all CWs that is, throughput per terminal (user throughput).

Furthermore, a case has been described in the present embodiment where base station 100 determines a cluster pattern (the number of clusters, cluster size or cluster spacing) and reports the cluster pattern to terminal 200. However, in the present invention, base station 100 may report only frequency resource information to terminal 200 every time base station 100 communicates with terminal 200 and terminal 200 may determine a cluster pattern (the number of clusters, cluster size or cluster spacing) according to transmission parameters of a signal transmitted by the terminal.

Furthermore, for example, base station 100 may report frequency resource information indicating a frequency band allocated with the number of clusters, cluster size and cluster spacing taken into account to terminal 200. To be more specific, base station 100 (scheduler 112 of base station 100) may perform scheduling and thereby perform allocation processing of allocating a frequency band to terminal 200 showing a maximum SINR in a certain frequency band (subcarrier). Base station 100 repeatedly performs the above allocation processing in different frequency bands and thereby performs frequency resource allocation of a C-SC-FDMA signal made up of a plurality of clusters. Base station 100 then reports frequency resource information indicating the frequency resource allocation result of the C-SC-FDMA signal of terminal 200 to terminal 200. Base station 100 also performs the above described frequency resource allocation processing on terminals other than terminal 200. This allows base station 100 to schedule allocation of frequency resources for all terminals located in the cell of base station 100. Furthermore, terminal 200 may map an SC-FDMA signal according to the frequency band indicated in the frequency resource information reported from base station 100. Thus, terminal 200 divides the SC-FDMA signal into a plurality of clusters in accordance with a cluster pattern corresponding to transmission parameters of a signal transmitted by the terminal and maps the plurality of clusters to discontinuous frequency resources, and can thereby obtain effects similar to those of the present embodiment.

Embodiment 2

The present embodiment will describe a case where MIMO (Multi-Input Multi-Output) transmission which is one of transmission techniques for realizing high-speed, large-volume data transmission is used. The MIMO transmission technique can increase throughput by providing a plurality of antennas for both a base station and a terminal, providing a plurality of propagation paths (streams) in a space between radio transmission and reception on the same time and the same frequency resources and spatially multiplexing the respective streams (a plurality of different data signal sequences are transmitted using a plurality of streams).

When a rank index indicating a spatial multiplexing number (or the number of signals separated on the receiving side) increases in MIMO transmission, the number of signal sequences (layers) that can be multiplexed (parallel transmission) in the space domain increases. That is, when the rank index increases, the number of layers in the space domain that needs to be separated increases at the base station which is the receiving side, and therefore ISI from a certain layer to a different layer, that is, ISI between layers increases.

Furthermore, when a channel through which each layer propagates has frequency selectivity, ISI for each layer is also generated in C-SC-FDMA as described in Embodiment 1.

Therefore, when the rank index increases in a channel having frequency selectivity, this causes ISI between layers that may affect signal separation in the space domain to increase. To reduce ISI between layers, the terminal preferably reduces ISI per layer as the rank index increases during MIMO transmission as with Embodiment 1. Thus, the terminal according to the present embodiment divides a CW (codeword) which is an SC-FDMA signal into a plurality of clusters in accordance with a cluster pattern corresponding to the rank index during MIMO transmission and maps the plurality of clusters to discontinuous frequency domains.

Figure 21:
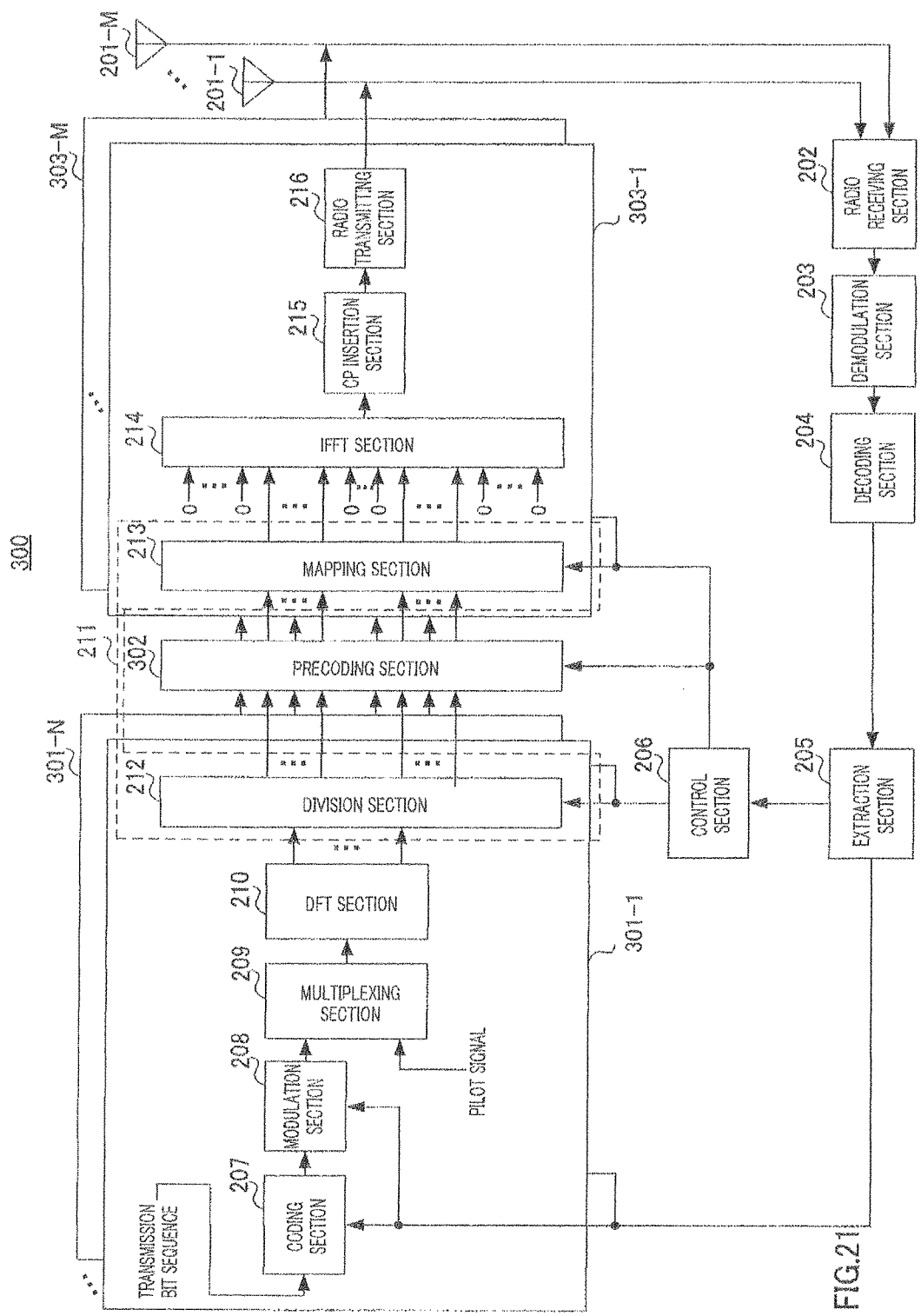
FIG. 21 is a block configuration diagram of a terminal according to Embodiment 2 of the present invention.

Hereinafter, this will be described more specifically. FIG. 21 shows a configuration of terminal 300 according to the present embodiment. Terminal 300 is provided with M antennas (antennas 201-1 to 201-M) that transmit CWs (a plurality of clusters) using M streams.

Furthermore, terminal 300 is provided with C-SC-FDMA processing sections 301-1 to 301-N corresponding in number to rank index N, made up of coding section 207, modulation section 208, multiplexing section 209, DFT section 210 and division section 212. Furthermore, terminal 300 is provided with transmission processing sections 303-1 to 303-M corresponding in number to antennas 201-1 to 201-M, made up of mapping section 213, IFFT section 214, CP insertion section 215 and radio transmitting section 216. Thus, terminal 300 is provided with setting section 211 made up of N division sections 212 and M mapping sections 213. Furthermore, N and M satisfy a relationship of N≤M.

C-SC-FDMA processing sections 301-1 to 301-N apply processing similar to that of coding section 207 to division section 212 of Embodiment 1 to their respective inputted transmission bit sequences (CW) and thereby generate C-SC-FDMA signals (a plurality of clusters). C-SC-FDMA processing sections 301-1 to 301-N output the C-SC-FDMA signals generated to precoding section 302.

Precoding section 302 receives a precoding matrix (or precoding weight) from control section 206. Here, precoding information indicating the precoding matrix is reported from a base station (not shown) to terminal 300. For example, the precoding information may show a number indicating each precoding matrix and control section 206 may calculate each precoding matrix based on the number indicated in the precoding information.

Precoding section 302 multiplies the C-SC-FDMA signals inputted from C-SC-FDMA processing sections 301-1 to 301-N by a single precoding matrix. Precoding section 302 then outputs the precoded C-SC-FDMA signals to transmission processing sections 303-1 to 303-M stream by stream.

Transmission processing sections 303-1 to 303-M apply processing similar to that of mapping section 213 to radio transmitting section 216 of Embodiment 1 to the respectively inputted precoded C-SC-FDMA signals and transmit the C-SC-FDMA signals after the transmission processing to the base station via antennas 201-1 to 201-M.

Here, setting section 211 divides an SC-FDMA signal of each layer (here, layer #1 to layer #N) into a plurality of clusters in accordance with a cluster pattern inputted from control section 206, that is, a cluster pattern corresponding to an MCS set that is set in a signal transmitted by the terminal, coding size or the rank index during MIMO transmission and maps the plurality of clusters to discontinuous frequency resources.

On the other hand, a scheduler (not shown) of the base station according to the present embodiment determines a cluster pattern of a C-SC-FDMA signal from each terminal according to an MCS set (modulation level and coding rate) set in the C-SC-FDMA signal from each terminal, coding size or the rank index during MIMO transmission of each terminal. The base station reports the determined cluster pattern to each terminal.

Next, methods of setting a cluster arrangement 2-1 to 2-6 by setting section 211 (division sections 212 and mapping sections 213) of terminal 300 will be described in detail.

Figure 23A:
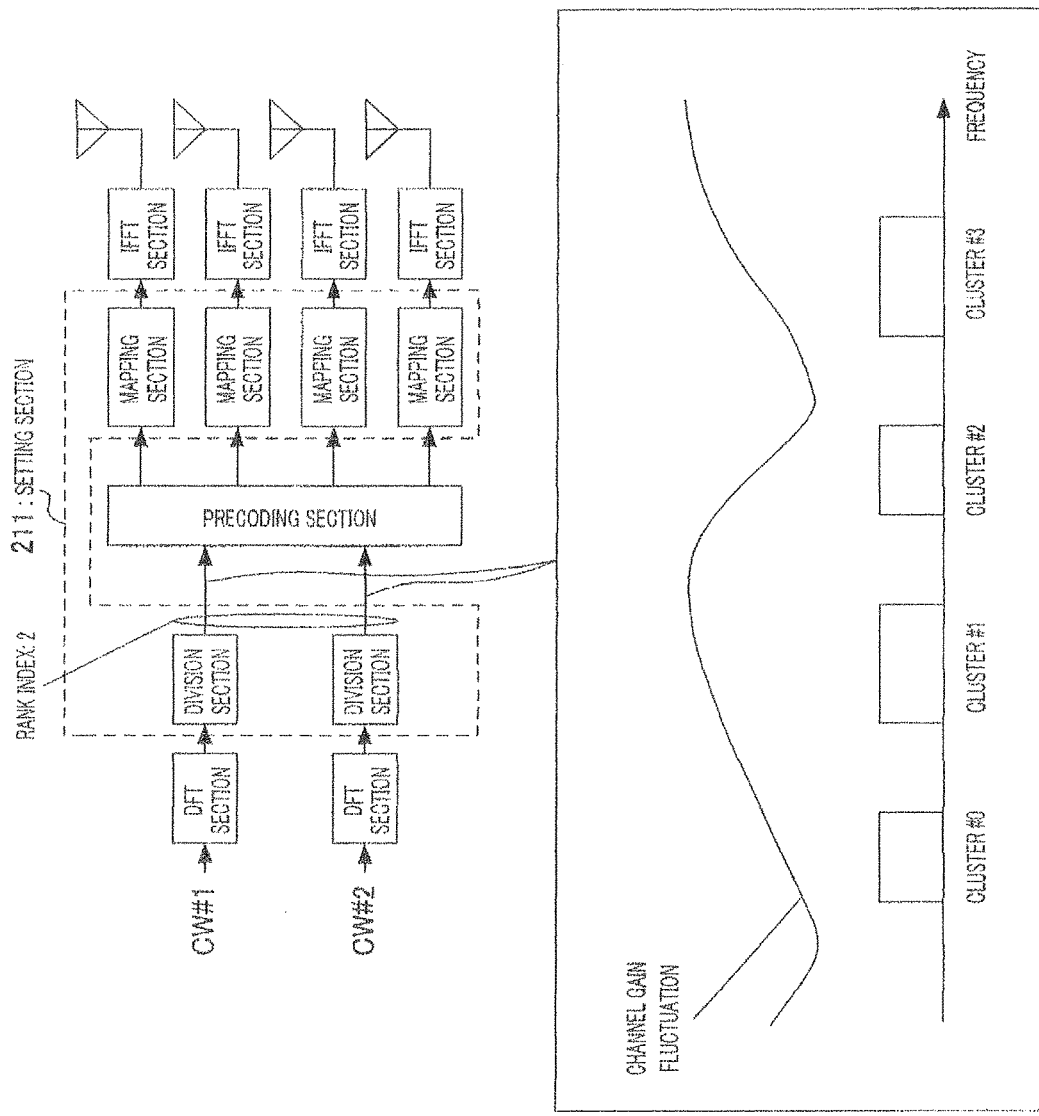
FIG. 23A is a diagram illustrating a method of setting a cluster arrangement according to Embodiment 2 of the present invention (when the rank index is small)
Figure 23B:
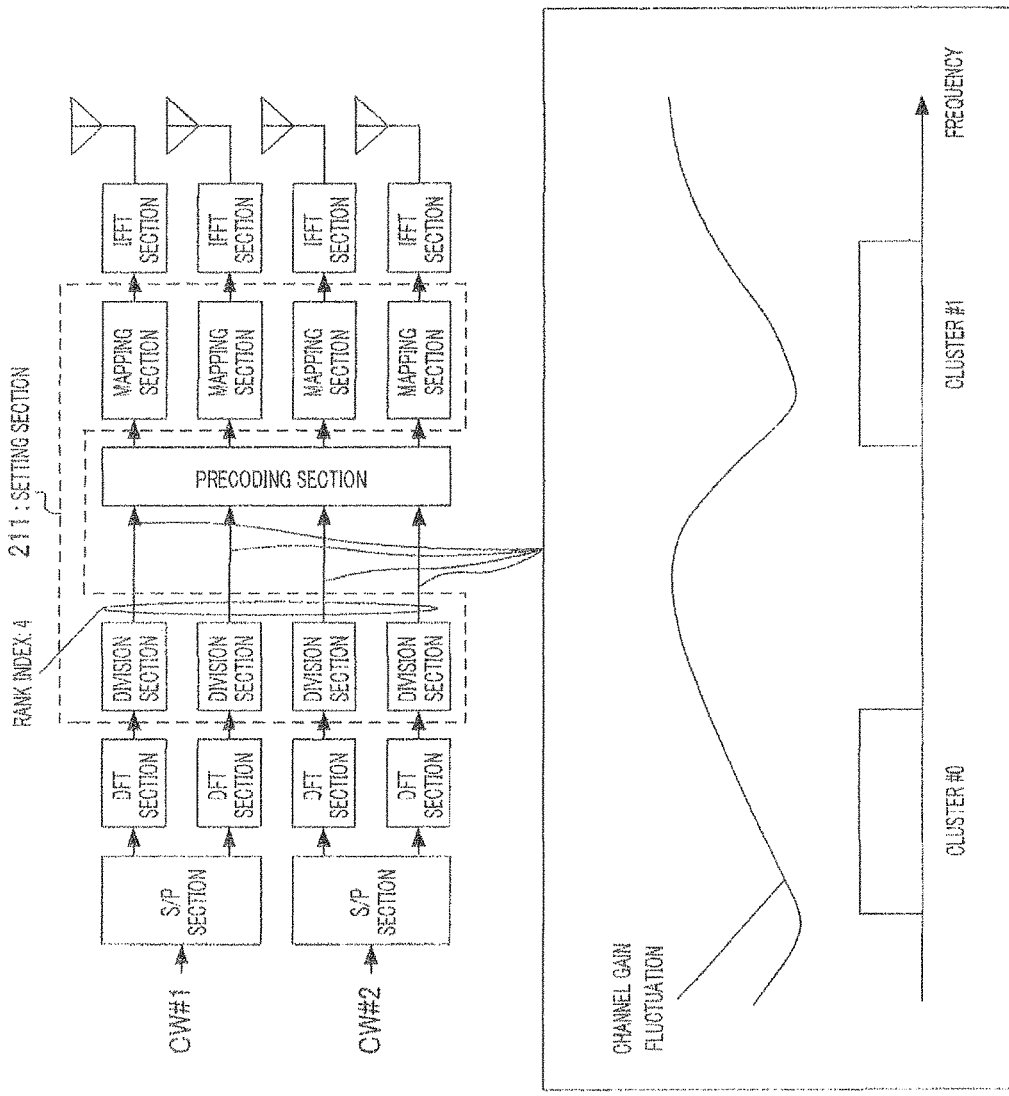
FIG. 23B is a diagram illustrating a method of setting a cluster arrangement according to Embodiment 2 of the present invention (when the rank index is large)

In the following descriptions, the number of antennas (the number of streams) is assumed to be 4 and terminal 300 is provided with antennas 201-1 to 201-4. Furthermore, suppose the number of CWs simultaneously transmitted by terminal 300 is 2. For simplicity of explanation, of the components of terminal 300 shown in FIG. 21, only DFT section 210, setting section 211 (division section 212 and mapping section 213), precoding section 302, IFFT section 214 and antenna 201 are illustrated as shown in FIG. 23A and FIG. 23B, for example. For example, in FIG. 23A and FIG. 23B, terminal 300 is provided with four mapping sections 213 and IFFT sections 214 corresponding in number to the number of antennas of 4 and is also provided with DFT sections 210 and division sections 212 corresponding in number to the rank index (e.g. the rank index: 2 in FIG. 23A, the rank index: 4 in FIG. 23B). Here, when the number of CWs simultaneously transmitted by terminal 300 is smaller than the rank index and the number of CWs is smaller than the number of streams as shown in FIG. 23B, terminal 300 is provided with (the rank index/the number of CWs) S/P (serial parallel conversion) sections between modulation section 208 and multiplexing section 209 of terminal 300 shown in FIG. 21. The S/P section converts each serially inputted CW to parallel, divides the converted CWs into a plurality of layers ((the rank index/the number of CWs) layers), whereby a plurality of CWs are mapped to as many layers as ranks. When the number of CWs, the rank index and the number of streams are the same, terminal 300 may apply DFT processing and division processing to each CW and then map each CW to each layer.

<Setting Method 2-1>

In the present setting method, setting section 211 divides the SC-FDMA signal in accordance with a cluster pattern with a smaller number of clusters (or a wider cluster size) for a higher rank index during MIMO transmission.

Hereinafter, this will be described more specifically. Here, a case will be described as shown in FIG. 22 where the rank index (low, medium, high)) is used. Furthermore, suppose the MCS set (coding rate and modulation level) set in a CW and coding size are fixed.

For a higher rank index, the scheduler of the base station reduces the number of clusters (widens the cluster size). To be more specific, the scheduler of the base station determines a cluster pattern that matches the number of clusters (high, medium, low) (or, cluster size (narrow, medium, wide)) according to the rank index (low, medium, high) as shown in FIG. 22.

Division section 212 of setting section 211 divides the CW in accordance with a cluster pattern with a smaller number of clusters (or a wider cluster size) for a higher rank index. To be more specific, when the rank index is small (the rank index: 2 in FIG. 23A), division section 212 divides the CW of each layer (the number of layers: 2 in FIG. 23A) such that the number of clusters increases (four clusters #0 to #3 in FIG. 23A), that is, the cluster size per cluster becomes narrower. On the other hand, when the rank index is large (the rank index: 4 in FIG. 23B), division section 212 divides the CW of each layer (the number of layers: 4 in FIG. 23A) such that the number of clusters decreases (two clusters #0 and #1 in FIG. 23B), that is, the cluster size becomes wider.

As described above, the higher the rank index, that is, the greater the interference between layers, the lower is the number of discontinuous points in a fluctuation of the equalized channel gain in a combined signal in each layer as in the case of setting method 1-1 of Embodiment 1. That is, since ISI occurring at combining points (discontinuous points) of clusters can be reduced as the rank index increases in each layer, ISI per layer can be reduced. That is, since ISI per layer is reduced as the rank index increases, it is possible to reduce ISI caused by a certain layer with another layer (ISI between layers).

Thus, the present setting method reduces ISI per layer, and can thereby reduce ISI between different layers, and therefore the base station which is the receiving side can improve transmission characteristics of each terminal without deteriorating signal separation capacity in the space domain. Even when the terminal divides the SC-FDMA signal by the number of clusters (the number of divisions) corresponding to the rank index during MIMO transmission, the present setting method can improve user throughput for each terminal while maintaining the effect of improving system throughput by C-SC-FDMA no matter what the rank index is, as with setting method 1-1 of Embodiment 1.

<Setting Method 2-2>

According to the present setting method, setting section 211 maps a plurality of clusters to frequency resources in accordance with a cluster pattern with a narrower cluster spacing for a higher rank index during MIMO transmission.

Figure 25A:
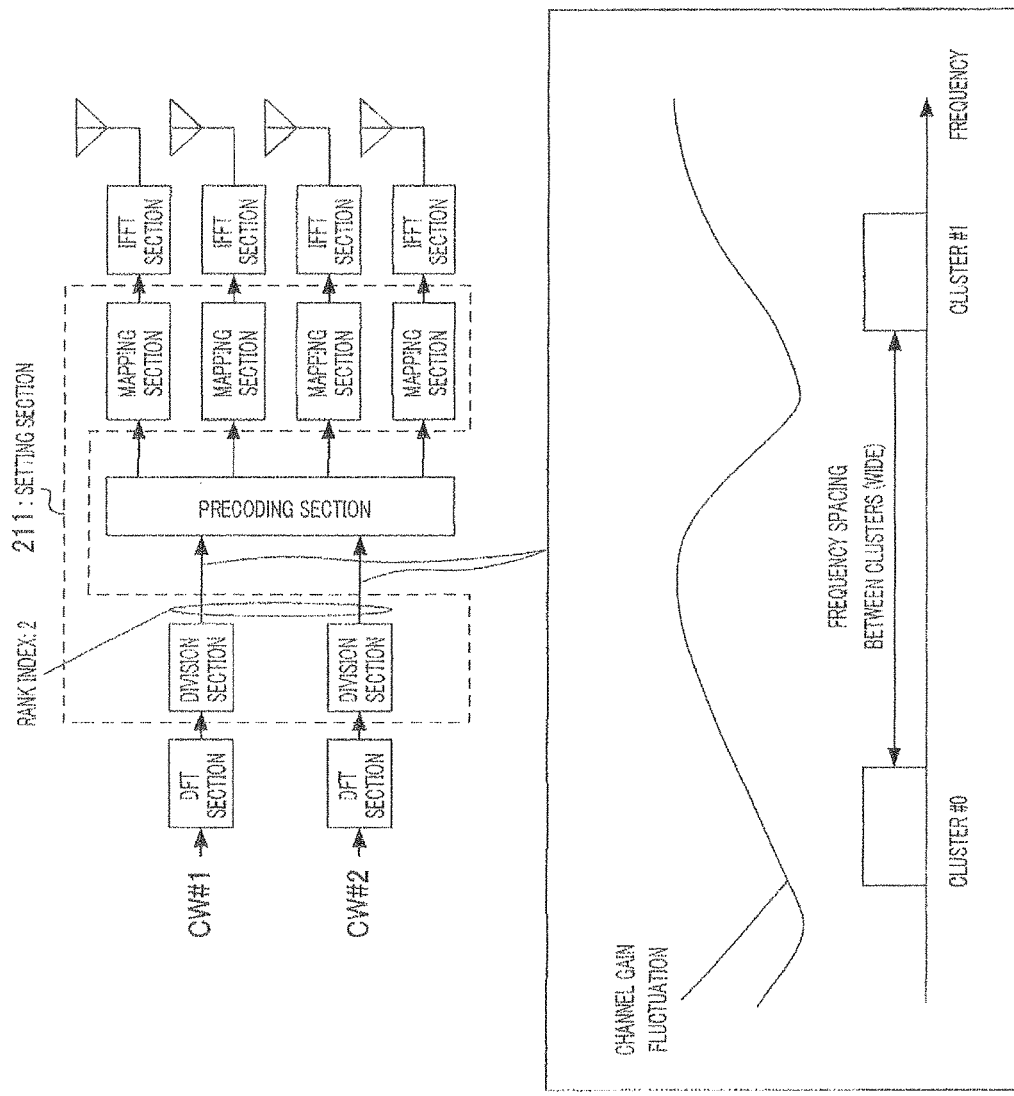
FIG. 25A is a diagram illustrating a method of setting a cluster arrangement according to Embodiment 2 of the present invention (when the rank index is small)

Hereinafter, this will be described more specifically. Here, a case will be described as shown in FIG. 24 where the rank index (low, medium, high)) is used. Furthermore, as shown in FIG. 25A and FIG. 25B, suppose the number of clusters of a C-SC-FDMA signal is 2. Furthermore, suppose the MCS set (coding rate and modulation level) set in a CW and coding size are fixed.

The scheduler of the base station narrows the cluster spacing for a higher rank index. To be more specific, as shown in FIG. 24, the base station determines a cluster pattern with a cluster spacing (wide, medium, narrow) according to the rank index (low, medium, high).

Mapping section 213 of setting section 211 maps a plurality of clusters making up a CW mapped to each layer to a plurality of discontinuous frequency resources in accordance with a cluster pattern with a narrower cluster spacing for a higher rank index. To be more specific, when the rank index is small (the rank index: 2 in FIG. 25A), mapping section 213 maps a plurality of clusters mapped to each layer (the number of layers: 2 in FIG. 25A) to frequency resources so that the cluster spacing becomes wider. On the other hand, when the rank index is large (the rank index: 4 in FIG. 25B), mapping section 213 maps a plurality of clusters mapped to each layer (the number of layers: 4 in FIG. 25A) to frequency resources so that the cluster spacing becomes narrower.

Thus, the higher the rank index, that is, the greater the interference between layers, the higher is the frequency correlation between a plurality of clusters making up CWs transmitted in each layer as with setting method 1-2 of Embodiment 1. It is possible to make a fluctuation of the equalized channel gain at combining points (discontinuous points) of a plurality of clusters more moderate for a higher rank index in each layer (that is, difference in equalized channel gain can be reduced), and thereby reduce ISI per layer. That is, as with setting method 2-1, ISI per layer is reduced for a higher rank index and it is thereby possible to reduce ISI (ISI between layers) caused by a certain layer with different layers.

According to the present setting method as with setting method 2-1, the base station which is the receiving side can improve transmission characteristics of each terminal without deteriorating signal separation capacity in the space domain. Thus, according to the present setting method, even when the terminal maps a plurality of clusters to frequency resources at a cluster spacing in accordance with the rank index during MIMO transmission, it is possible, as with setting method 2-1, to improve user throughput in each terminal while maintaining the effect of improving system throughput by C-SC-FDMA no matter what the rank index is.

<Setting Method 2-3>

According to the present setting method, setting section 211 uses the same cluster pattern (the number of clusters, cluster size or cluster spacing) for CWs (SC-FDMA signal) mapped to different layers during MIMO transmission.

Figure 26A:
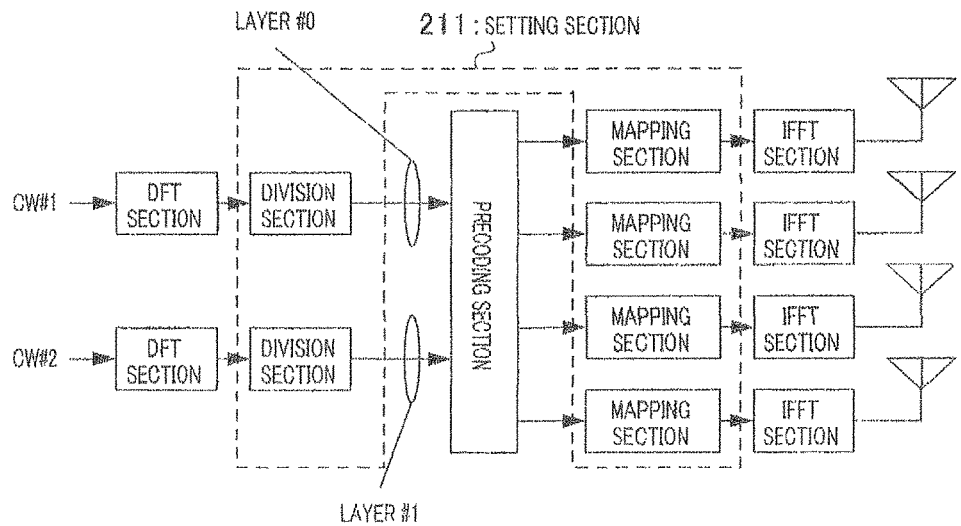
FIG. 26A is a block configuration diagram of a terminal according to Embodiment 2 of the present invention (when the rank index is 2)

Hereinafter, this will be described more specifically. Here, suppose the rank index is 2. As shown in FIG. 26A, of two CWs (CW #1 and CW #2), CW #1 is mapped to layer #0 and CW #2 is mapped to layer #1.

The scheduler of the base station determines the same cluster pattern for CWs (CW #1 and CW #2 shown in FIG. 26A) mapped to different layers (layer #0 and layer #1 shown in FIG. 26A) in terminal 300.

Figure 26B:
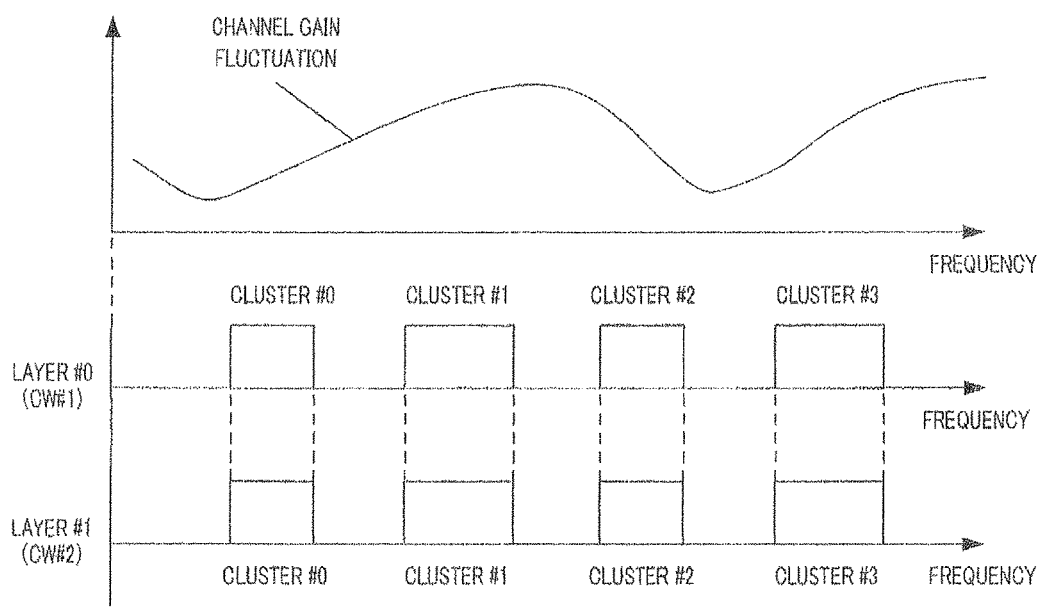
FIG. 26B is a diagram illustrating a method of setting a cluster arrangement according to Embodiment 2 of the present invention (when the rank index is 2)

Division section 212 of setting section 211 divides CWs mapped to different layers by the same number of clusters (or the same cluster size) to generate a plurality of clusters according to the cluster pattern (the number of clusters or cluster size) reported from the base station. For example, division section 212 divides both CW #1 mapped to layer #0 and CW #2 mapped to layer #1 into four clusters #0 to #3 as shown in FIG. 26B.

Furthermore, mapping section 213 of setting section 211 maps CWs (a plurality of clusters divided by division section 212) mapped to the different layers to frequency resources with the same cluster spacing in accordance with a cluster pattern (cluster spacing) reported from the base station. For example, mapping section 213 maps clusters #0 to #3 of CW #1 mapped to layer #0 and clusters #0 to #3 of CW #2 mapped to layer #1 to the same frequency resources with the same cluster spacing as shown in FIG. 26B.

Thus, according to the present setting method, terminal 300 uses the same cluster pattern for CWs (SC-FDMA signal) mapped to different layers, which causes statistical characteristics of ISI in the frequency domain to become substantially the same between layers. That is, substantially the same ISI occurs between different layers. This reduces the distribution of ISI power between layers and prevents the occurrence of ISI between layers whereby a layer having high ISI interferes with a layer having small ISI.

According to the present setting method, the base station can further improve transmission characteristics when a signal separation technique such as PIC (Parallel Interference Canceller) is used whereby signal separation capacity in the space domain is improved as the difference in receiving quality between layers decreases. According to the present setting method, the statistical characteristics of ISI become substantially the same between layers, which reduces the probability that layers in which receiving quality considerably deteriorates will occur. The base station can improve average reception characteristics of all layers and thereby further improve error rate (block error rate) characteristics of CWs.

<Setting Method 2-4>

According to the present setting method, setting section 211 uses the same cluster pattern (the number of clusters, cluster size or cluster spacing) for an SC-FDMA signal in the same CWs mapped to different layers during MIMO transmission.

Figure 27A:
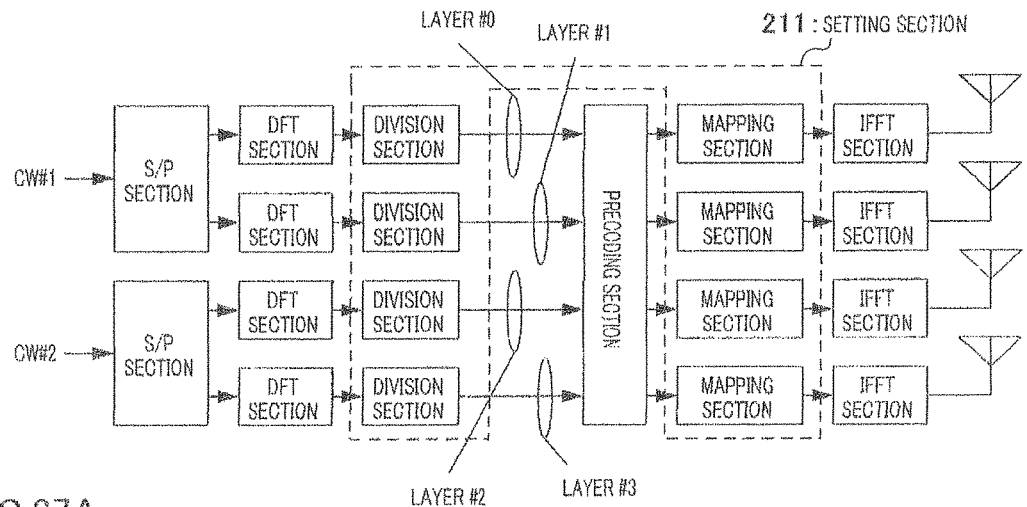
FIG. 27A is a block configuration diagram of the terminal according to Embodiment 2 of the present invention (when the rank index is 4)

Hereinafter, this will be described more specifically. Here, suppose the rank index is 4. As shown in FIG. 27A, of two CWs (CW #1 and CW #2), CW #1 is mapped to two layers of layer #0 and layer #1, and CW #2 is mapped to two layers of layer #2 and layer #3.

The scheduler of the base station determines the same cluster pattern for the SC-FDMA signal in the same CW mapped to different layers (layers #0 to #3 shown in FIG. 27A) in terminal 300. To be more specific, the scheduler determines the same cluster pattern for CW1 mapped to layer #0 and layer #1 shown in FIG. 27A and determines the same cluster pattern for CW2 mapped to layer #2 and layer #3 shown in FIG. 27A.

Figure 27B:
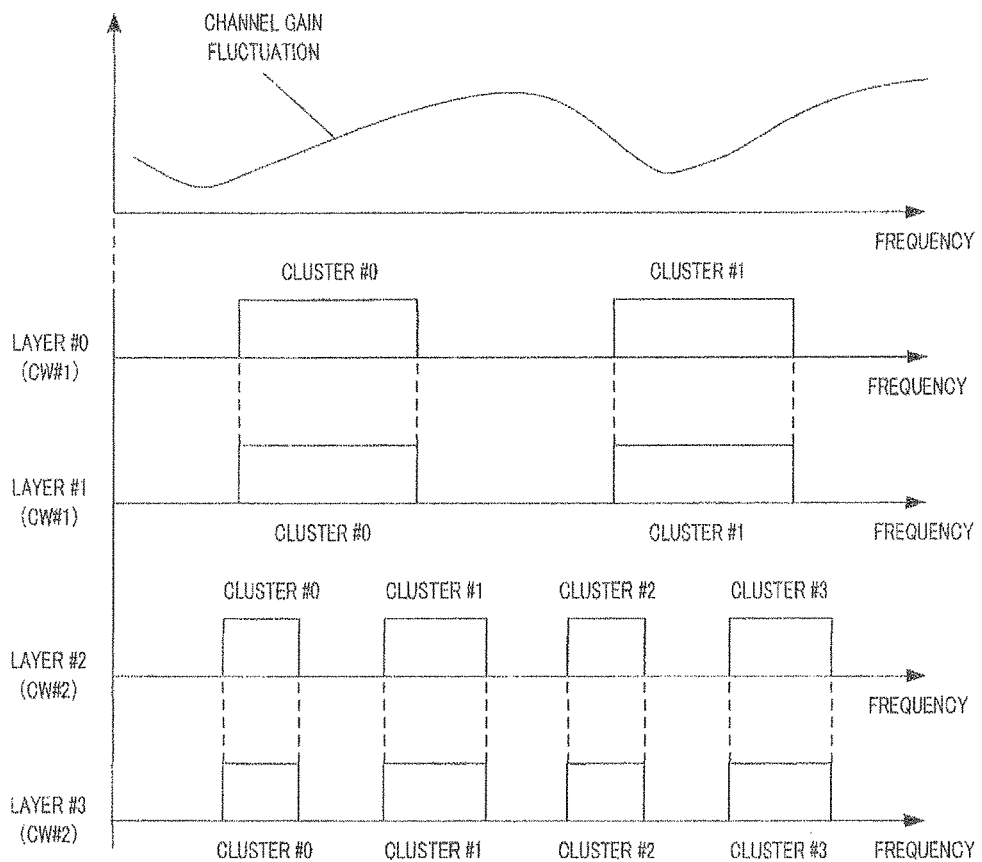
FIG. 27B is a diagram illustrating a method of setting a cluster arrangement according to Embodiment 2 of the present invention (when the rank index is 2)

Division section 212 of setting section 211 divides the SC-FDMA signal in the same CW mapped to different layers by the same number of clusters (or the same cluster size) in accordance with a cluster pattern (the number of clusters or cluster size) reported from the base station. For example, division section 212 of setting section 211 divides CW #1 mapped to layer #0 and layer #1 as shown in FIG. 27B into two clusters (cluster #0, cluster #1) in each layer. Likewise, division section 212 divides CW #2 mapped to layer #2 and layer #3 as shown in FIG. 27B into four clusters (clusters #0 to #3) in each layer.

Furthermore, mapping section 213 of setting section 211 maps the SC-FDMA signal in the same CWs mapped to different layers to frequency resources with the same cluster spacing in accordance with a cluster pattern (cluster spacing) reported from the base station. For example, mapping section 213 maps clusters #0 and #1 of CW #1 mapped to layer #0 and layer #1 as shown in FIG. 27B to the same frequency resources with the same cluster spacing. Likewise, mapping section 213 maps clusters #0 to #3 of CW #2 mapped to layer #2 and layer #3 as shown in FIG. 27B to the same frequency resources with the same cluster spacing.

Thus, according to the present setting method, terminal 300 uses the same cluster pattern for the SC-FDMA signal in the same CW mapped to different layers and thereby causes statistical characteristics of ISI in the frequency domain to be substantially the same between layers for the same CW. That is, substantially the same ISI occurs in different layers to which the same CW is mapped. That is, in different layers to which the same CW is mapped, the magnitude of ISI generated per layer and ISI between layers are substantially the same. Thus, the magnitude of ISI becomes uniform in the same CW.

According to the present setting method, since the difference in receiving quality between layers can be reduced for the same CW, it is possible to improve coding gains for coding and improve reception characteristics. That is, according to the present setting method, it is possible to make the distribution of ISI received by each bit (or each symbol) in the same CW substantially uniform, that is, suppress the distribution of LLR (Log Likelihood Ratio) per bit (or symbol) in CW to a small level. This makes it possible to improve reception characteristics for each CW.

<Setting Method 2-5>

According to the present setting method, of CWs (SC-FDMA signal) mapped to different layers during MIMO transmission, setting section 211 decreases the number of clusters (or widens the cluster size) for CWs (SC-FDMA signal) having a higher transmission rate (MCS set).

Hereinafter, this will be described more specifically. Here, terminal 300 applies coding processing and modulation processing to CWs using different MCS sets for the respective CWs, performs link adaptation in the space domain, and thereby transmit a plurality of CWs having different transmission rates in parallel in the space domain. For example, a case as shown in FIG. 28 will be described where a transmission rate (MCS set) (low, medium, high) is used. A high MCS set (coding rate: high, modulation level: high) is set in CW #1 and a low MCS set (coding rate: low, modulation level: low) is set in CW #2 shown in FIG. 29. Furthermore, CW #1 is mapped to layer #0 and CW #2 is mapped to layer #1.

Of a plurality of CWs mapped to different layers and transmitted by terminal 300, the scheduler of the base station determines a cluster pattern having a smaller number of clusters (wider cluster size) for CWs having a higher transmission rate (MCS set). To be more specific, as shown in FIG. 28, the base station determines a cluster pattern that matches the number of clusters (high, medium, low) (or cluster size (narrow, medium, wide)) according to the MCS set (low, medium, high).

Figure 29:
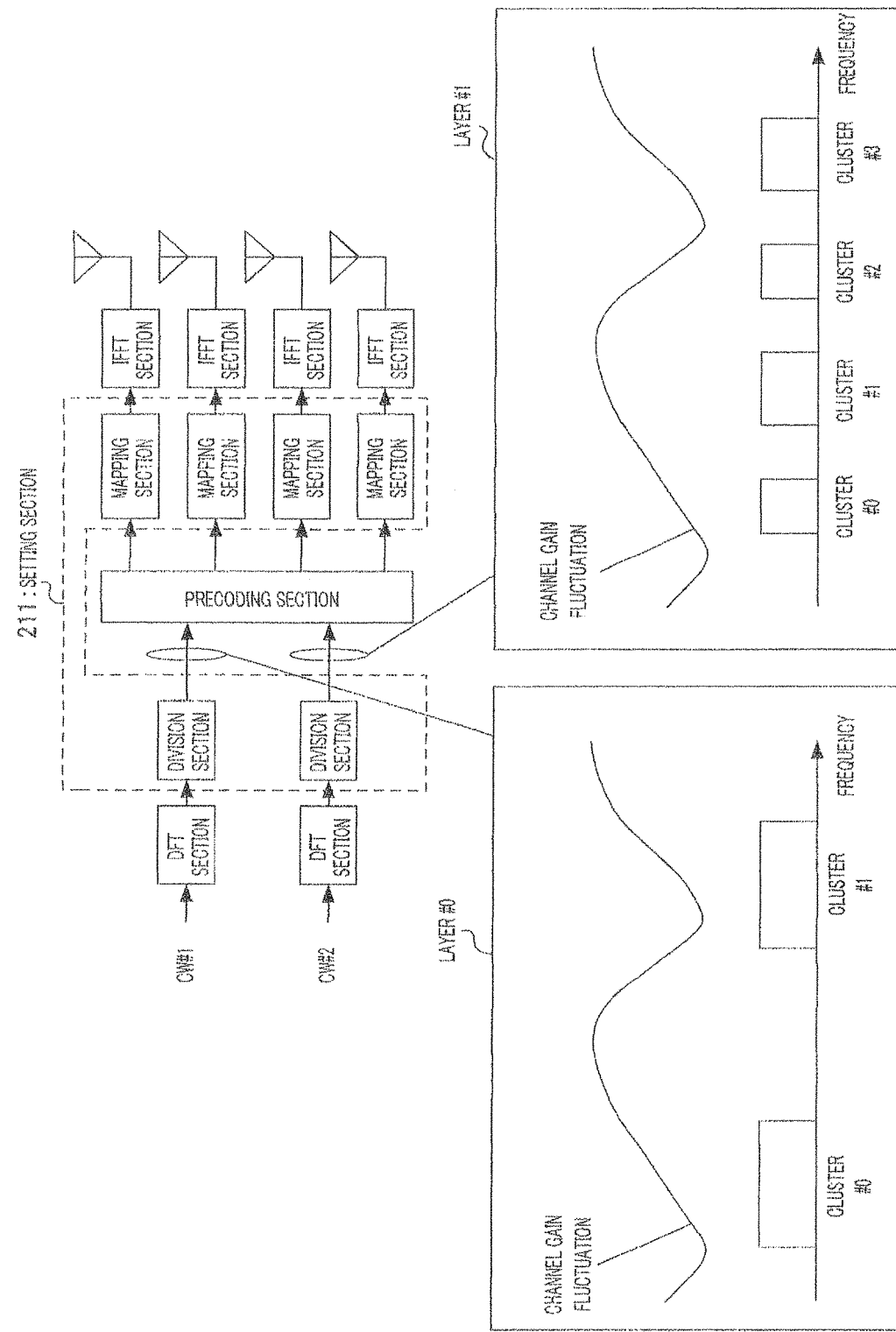
FIG. 29 is a diagram illustrating a method of setting a cluster arrangement according to Embodiment 2 of the present invention.
Figure 3:
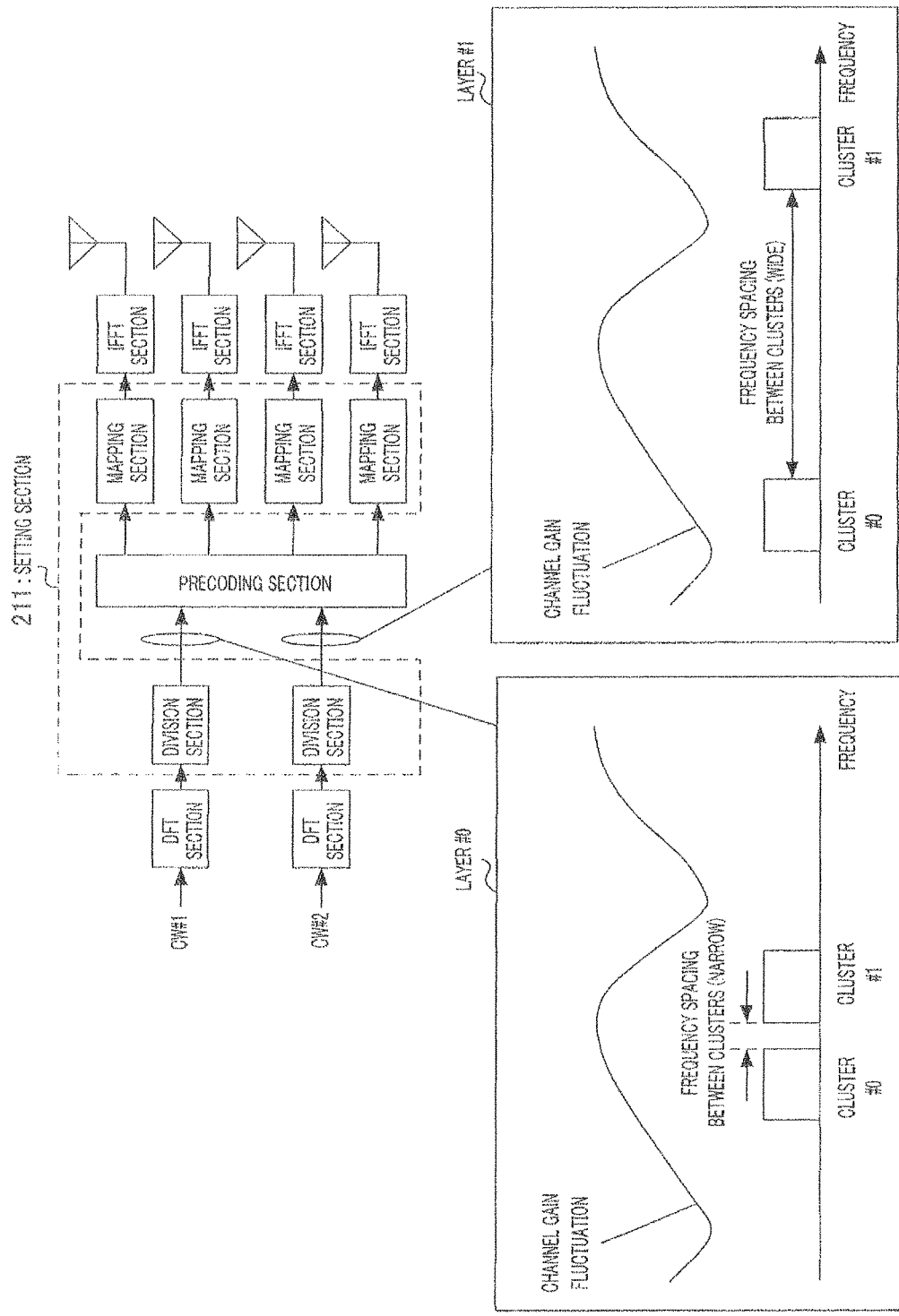

Of the plurality of CWs mapped to different layers, setting section 211 decreases the number of clusters (widens the cluster size) for CWs of a higher MCS set. To be more specific, setting section 211 decreases the number of clusters for CW #1 having a higher MCS set as shown in FIG. 29 (two clusters #0 and #1 in FIG. 29), that is, widens the cluster size per cluster. On the other hand, setting section 211 increases the number of clusters for CW #2 having a lower MCS set (four clusters #0 to #3 in FIG. 29), that is, narrows the cluster size per cluster.

Thus, for CWs having a higher transmission rate (MCS set), that is, CWs more susceptible to the influence of ISI (CWs having lower allowable ISI), the number of discontinuous points in a fluctuation of the equalized channel gain of a combined signal decreases as with setting method 1-1 of Embodiment 1. It is thereby possible to reduce ISI occurring at combining points (discontinuous points) in a plurality of clusters for CWs having a higher transmission rate (MCS set).

Furthermore, setting section 211 increases the number of clusters (narrows the cluster size) for CWs having a lower transmission rate (MCS set), that is, CWs less susceptible to the influence of ISI (CWs having greater allowable ISI). This increases the number of discontinuous points in a fluctuation of the equalized channel gain in a combined signal as with setting method 1-1 of Embodiment 1 in the base station, but since robustness against ISI is high, it is possible to improve the frequency diversity effect in the range of allowable ISI.

Thus, the present setting method sets the number of clusters (cluster size) for CWs of different transmission rates (MCS sets), and can thereby improve throughput per CW. That is, overall throughput (user throughput) of a plurality of CWs can be improved as a consequence.

<Setting Method 2-6>

According to the present setting method, of CWs (SC-FDMA signal) mapped to different layers during MIMO transmission, setting section 211 narrows a cluster spacing for CWs (SC-FDMA signal) having a higher transmission rate (MCS set).

Hereinafter, this will be described more specifically. Here, as with setting method 2-5, terminal 300 performs link adaptation in the space domain using different MCS sets for respective CWs. A case will be described as an example where a transmission rate (MCS set) (low, medium, high) is used as shown in FIG. 30. Furthermore, as with setting method 2-5, a high MCS set (coding rate: high, modulation level: high) is set in CW #1 shown in FIG. 31 and a low MCS set (coding rate: low, modulation level: low) is set in CW #2. Furthermore, CW #1 is mapped to layer #0 and CW #2 is mapped to layer #1.

Of a plurality of CWs mapped to different layers and transmitted by terminal 300, the scheduler of the base station determines a cluster pattern with a narrower cluster spacing for CWs having a higher transmission rate (MCS set). To be more specific, as shown in FIG. 30, the base station determines a cluster pattern with a cluster spacing (wide, medium, narrow) according to the MCS set (low, medium, high).

Of the plurality of CWs mapped to different layers, setting section 211 narrows the cluster spacing for CWs having a higher MCS set. To be more specific, setting section 211 narrows the cluster spacing for CW #1 having a higher MCS set as shown in FIG. 31. On the other hand, setting section 211 widens the cluster spacing for CW #2 having a lower MCS set.

Thus, for CWs having a higher transmission rate (MCS set), that is, for CWs more susceptible to the influence of ISI (CWs having lower allowable ISI), the frequency correlation among a plurality of clusters making up a CW is increased as with setting method 1-2 of Embodiment 1. This makes it possible to make more moderate a fluctuation of the equalized channel gain at combining points (discontinuous points) of a plurality of clusters for CWs having a higher transmission rate (MCS set) (that is, the difference in equalized channel gain can be reduced), and thereby reduce ISI in a CW.

Furthermore, setting section 211 widens the cluster spacing for CWs having a lower transmission rate (MCS set), that is, for CWs less susceptible to the influence of ISI (CWs having greater allowable ISI). Although this makes the fluctuation of the equalized channel gain at combining points (discontinuous points) of the combined signal more abrupt (that is, the difference in equalized channel gain increases) as with setting method 1-2 of Embodiment 1, the base station can improve the frequency diversity effect in the range of allowable ISI because robustness against ISI is sufficiently high.

Thus, the present setting method sets the cluster spacing according to CWs having different transmission rates (MCS sets), and can thereby improve throughput per CW as with setting method 2-5. That is, it is possible to improve overall throughput (user throughput) of a plurality of CWs as a consequence.

Setting methods 2-1 to 2-6 have been described so far.

Thus, the present embodiment can obtain effects similar to those in Embodiment 1 even when MIMO transmission is used.

In the present embodiment, the base station may also set a threshold of the rank index to determine a cluster pattern in the same way as in Embodiment 1 (FIG. 16A to FIG. 19C). Hereinafter, an example where the base station sets a threshold and determines a cluster pattern will be described using FIGS. 32A to 32E. In FIGS. 32A to 32E, $B_i$ (i=0, 1, . . . ) is a bandwidth (cluster size) per cluster and indicates, for example, a minimum bandwidth (minimum cluster size) defined for every range separated by a threshold and holds the relationship $B_i \leq B_{i+1}$. Furthermore, $B'_i$ (i=0, 1, . . . ) represents a maximum cluster spacing defined for every range separated by a threshold and holds the relationship $B'_i \geq B'_{i+1}$.

For example, as shown in FIG. 32A, the base station may also set a threshold for each rank index, compare the rank index (RI) of each terminal with the threshold and determine the number of clusters (X). To be more specific, the base station determines the number of clusters X to be 4 when the rank index RI is 1 and determines the number of clusters X to be 3 when the rank index RI is 2. The same applies to a case where the rank index RI is 3 or 4. That is, in FIG. 32A, a fixed number of clusters is set for the rank index.

Furthermore, as shown in method 1 in FIG. 32B, the base station may set a threshold for each rank index and set an upper limit of the number of clusters X for each rank index. For example, as shown in method 1 of FIG. 32B, the base station determines one number of clusters whose upper limit is the number of clusters X=4 when the rank index RI is 1 and determines one number of clusters whose upper limit is the number of clusters X=3 when the rank index RI is 2. The same applies to a case where the rank index is 3 or 4. Setting section 211 of each terminal sets the number of clusters according to the rank index in this way, and can thereby limit the maximum value of ISI per layer so as to prevent ISI from a different layer from exceeding allowable ISI. Thus, the base station can correctly select an MCS set of each layer in each terminal. Furthermore, as shown in method 2 in FIG. 32B, the base station may also set a lower limit and an upper limit of the number of clusters for each rank index. For example, as shown in method 2 in FIG. 32B, the base station determines one number of clusters in a range of $2 \leq X \leq 4$ when the rank index RI is 1 and determines one number of clusters in a range of $2 \leq X \leq 3$ when the rank index RI is 2. As shown in FIG. 3A or FIG. 3B, this allows the setting section 211 of each terminal to set only such a number of clusters X that matches the user throughput of a certain value or above including the maximum value. Furthermore, the base station can reduce the number of reporting bits to report the number of clusters X per layer.

Furthermore, as shown in FIG. 32C, the base station may also set a threshold so as to separate between a plurality of rank indexes for every certain range of rank index and set a cluster size (Y) for every range of rank index. According to method 1 in FIG. 32C, as with method 1 in FIG. 32B, the base station determines one cluster size Y whose lower limit is a minimum cluster size ($B_0$, $B_1$, $B_2$, $B_3$ shown in method 1 in FIG. 32C) defined for every range of rank index. As shown in method 1 in FIG. 32C, when the rank index RI is 1 to 2 which is a range having the lowest rank index (that is, allowable ISI is maximum), the base station may arbitrarily set cluster size Y. Furthermore, according to method 2 in FIG. 32C, as with method 2 in FIG. 32B, an upper limit and a lower limit of the cluster size are set for every range of rank index.

Furthermore, when the base station calculates cluster size (Y) using the number of clusters (X), as shown in FIG. 32D, the base station may set a threshold for each rank index, set the number of clusters $X_{ri}$ for each rank index and calculate cluster size Y. Here, $X_{ri}$ (ri=0, 1, 2, . . . , ri is a number assigned for every range of the rank index separated by a threshold) represents the number of clusters set for each rank index in each range (ri). Furthermore, B represents the total bandwidth (that is, the sum of cluster sizes) used for a C-SC-FDMA signal. To be more specific, in FIG. 32D, the base station calculates cluster size $Y=B/X_{ri}$ set in the rank index using the number of clusters $X_{ri}$ set for each rank index (ri=0, 1, 2, . . . ).

Furthermore, as shown in FIG. 32E, the base station may also set cluster spacing (Z) for each rank index by setting a threshold for each rank index. In FIG. 32E, the base station determines cluster spacing Z whose upper limit corresponds to a maximum cluster spacing ($B'_0$, $B'_1$, $B'_2$, $B'_3$ shown in FIG. 32E) for each rank index. As shown in FIG. 32E, when the rank index RI is 1, the base station may set an arbitrary value for cluster spacing Z.

A case has been described in the present embodiment in FIG. 23B, FIG. 25B and FIG. 27A where the S/P section in terminal 300 converts CW from serial to parallel and the DFT section performs DFT processing. However, in terminal 300 of the present invention, the DFT section may perform DFT processing on a CW and then the S/P section may convert the CW from serial to parallel as shown in FIG. 23B, FIG. 25B and FIG. 27A.

Furthermore, the present embodiment is applicable to both single user (SU)-MIMO transmission (that is, MIMO transmission between a plurality of antennas of one base station and a plurality of antennas of one terminal) and multiuser (MU)-MIMO transmission (that is, MIMO transmission between a plurality of antennas of one base station and a plurality of antennas of a plurality of terminals).

Furthermore, a case has been described with setting methods 2-1 and 2-2 of the present embodiment where a cluster pattern is determined according to the rank index. However, the present invention can determine a cluster pattern according to the number of spatially multiplexed CWs. This makes it possible to control the magnitude of ISI between different CWs according to the number of CWs and improve transmission characteristics per CW. This increases the probability of being able to select an MCS set with higher efficiency of use of frequency resources, and can thereby further improve user throughput.

Furthermore, MIMO transmission using precoding has been described in the present embodiment, but the present invention is also applicable to MIMO transmission without precoding (that is, when a precoding matrix is assumed as a unit matrix).

The embodiments of the present invention have been described so far.

A case has been described in the above embodiments where a cluster pattern is controlled according to an MCS set, coding size or rank index. However, as the number of frequency resources allocated to a signal transmitted by the terminal, the number of resource elements (RE) or the number of RBs bundling a plurality of REs decreases, the present invention may reduce the number of clusters (widen the cluster size) or narrow the cluster spacing. This allows effects similar to those in the above embodiments to be thereby obtained.

Furthermore, the present invention may combine Embodiment 1 and Embodiment 2.

Furthermore, the terminal may also be called "UE (User Equipment)" and the base station may also be called "Node B or BS (Base Station)."

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-292653, filed on Nov. 14, 2008, including the specification, drawings and abstract is incorporated herein by reference in its entirety.

INDUSTRIAL APPLICABILITY

The present invention is applicable to a mobile communication system or the like.

The invention claimed is:

1. A communication apparatus, comprising:
  circuitry, which, in operation, implements:
    a discrete Fourier transformer which, in operation, performs Fourier transformations (DFTs) on a plurality of symbol sequences that derive from two code words, each of the plurality of symbol sequences corresponding to one of a plurality of layers, wherein a number of the plurality of layers is at least two;
    a precoder which, in operation, generates four precoded symbol sequences based on the plurality of DFT transformed symbol sequences and a precoding matrix; and
    a mapper which, in operation, maps each of the four precoded symbol sequences on a same set of discontinuous frequency resources, each frequency resource being located on a separate position from other frequency resources on a frequency axis, wherein the four precoded symbol sequences share a number of clusters, cluster sizes, and a frequency position of each of the clusters in common, a cluster size being a frequency bandwidth of the discontinuous frequency resource; and a plurality of antenna ports which, in operation, transmit the mapped four precoded symbol sequences, wherein the four precoded symbol sequences include first and second precoded symbol sequences corresponding to a first code word and include third and fourth precoded symbol sequences corresponding to a second code word that is different from the first code word.

2. The communication apparatus according to claim 1, wherein a number of the plurality of antenna ports is four.

3. The communication apparatus according to claim 1 wherein the cluster size is defined according to a minimum cluster size.

4. The communication apparatus according to claim 1, wherein a rank indicator identifying a number of the plurality of layers is equal to or less than a number of antenna ports provided at the communication apparatus.

5. A communication method, performed by a communication apparatus, the method comprising:

performing discrete Fourier transformations (DFT) on a plurality of symbol sequences that derive from two code words, each of the plurality of symbol sequences corresponding to one of a plurality of layers, wherein a number of the plurality of layers is at least two;

generating four precoded symbol sequences based on the plurality of DFT transformed symbol sequences and a precoding matrix;

mapping each of the four precoded symbol sequences on a same set of discontinuous frequency resources, each frequency resource being located on a separate position from other frequency resources on a frequency axis, wherein the four precoded symbol sequences share a number of clusters, cluster sizes, and a frequency position of each of the clusters in common, a cluster size being a frequency bandwidth of the discontinuous frequency resource; and transmitting the mapped four precoded symbol sequences using a plurality of antenna ports, wherein the four precoded symbol sequences include first and second precoded symbol sequences corresponding to a first code word and include third and fourth precoded symbol sequences corresponding to a second code word that is different from the first code word.

6. The communication method according to claim 5, wherein a number of the plurality of antenna ports is four.

7. The communication method according to claim 5 wherein the cluster size is defined according to a minimum cluster size.

8. The communication method according to claim 5, wherein a rank indicator identifying a number of the plurality of layers is equal to or less than a number of antenna ports provided at the communication apparatus.

9. A communication apparatus, comprising:
circuitry, which, in operation, implements:

a discrete Fourier transformer which, in operation, performs Fourier transformations (DFTs) on a plurality of symbol sequences that derive from two code words, each of the plurality of symbol sequences corresponding to one of a plurality of layers, wherein a number of the plurality of layers is at least two;

a precoder which, in operation, generates four precoded symbol sequences based on a plurality of DFT transformed symbol sequences and a precoding matrix; and a mapper which, in operation, maps each of the four precoded symbol sequences to a plurality of frequency resources, each of the plurality of frequency resources being located on a separate position from other frequency resources on a frequency axis, wherein the four precoded symbol sequences share: a number of frequency resources used to map each precoded symbol sequence; a size of each of the frequency resources; and a frequency position of each of the frequency resources, the size being a frequency resource bandwidth; and a plurality of antenna ports which, in operation, transmit the mapped four precoded symbol sequences, wherein the four precoded symbol sequences include first and second precoded symbol sequences corresponding to a first code word and include third and fourth precoded symbol sequences corresponding to a second code word that is different from the first code word.

10. A communication method performed by a communication apparatus, the method comprising:

performing discrete Fourier transformations (DFT) on a plurality of symbol sequences that derive from two code words, each of the plurality of symbol sequences corresponding to one of a plurality of layers, wherein a number of the plurality of layers is at least two;

generating four precoded symbol sequences based on the plurality of DFT transformed symbol sequences and a precoding matrix;

mapping each of the four precoded symbol sequences to a plurality of frequency resources, each of the plurality of frequency resources being located on a separate position from other frequency resources on a frequency axis, wherein the four precoded symbol sequences share: a number of frequency resources used to map each precoded symbol sequence; a size of each of the frequency resources; and a frequency position of each of the frequency resources, the size being a frequency resource bandwidth; and transmitting the mapped four precoded symbol sequences using a plurality of antenna ports, wherein the four precoded symbol sequences include first and second precoded symbol sequences corresponding to a first code word and include third and fourth precoded symbol sequences corresponding to a second code word that is different from the first code word.

* * * * *